US00RE50163E

(19) United States
(12) Reissued Patent
Ophardt et al.

(10) Patent Number: US RE50,163 E
(45) Date of Reissued Patent: Oct. 8, 2024

(54) STATIONARY OUTLET STEM PUMP

(71) Applicant: OP-Hygiene IP GmbH, Niederbipp (CH)

(72) Inventors: Heiner Ophardt, Arisdorf (CH); Andrew Jones, St. Anns (CA)

(73) Assignee: OP-Hygiene IP GmbH, Niederbipp (CH)

(21) Appl. No.: 18/232,242

(22) Filed: Aug. 9, 2023

Related U.S. Patent Documents

Reissue of:
(64) Patent No.: 11,084,052
Issued: Aug. 10, 2021
Appl. No.: 16/731,314
Filed: Dec. 31, 2019

(51) Int. Cl.
*B05B 11/00* (2023.01)
*A47K 5/12* (2006.01)
*B05B 11/10* (2023.01)

(52) U.S. Cl.
CPC ..... *B05B 11/0008* (2013.01); *A47K 5/1207* (2013.01); *B05B 11/1001* (2023.01)

(58) Field of Classification Search
CPC ..... B05B 11/0008; B05B 11/1001; B05B 11/1087; A47K 5/1202; A47K 5/1204; A47K 5/1207; A47K 5/1211
See application file for complete search history.

(56) References Cited

U.S. PATENT DOCUMENTS 5,282,552 A * 2/1994 Ophardt ..... A47K 5/1204 222/181.2
5,373,970 A * 12/1994 Ophardt ..... A47K 5/1207 222/181.2
5,975,360 A * 11/1999 Ophardt ..... A47K 5/1205 222/83
6,409,050 B1 * 6/2002 Ophardt ..... A47K 5/14 222/181.1
6,557,736 B1 * 5/2003 Ophardt ..... B05B 11/007 222/321.7
7,267,251 B2 * 9/2007 Ophardt ..... B05B 11/3001 222/321.9
7,303,099 B2 12/2007 Ophardt
RE40,319 E * 5/2008 Ophardt ..... 222/181.1
8,893,932 B2 11/2014 Ophardt et al.
8,944,294 B2 2/2015 Ophardt et al.
9,573,152 B2 2/2017 Ophardt et al.
10,144,020 B2 12/2018 Ophardt et al.
10,588,466 B2 3/2020 Jones et al.
2002/0148912 A1 * 10/2002 Ophardt ..... B05B 11/3001 239/428.5
2002/0158085 A1 * 10/2002 Ophardt ..... A47K 5/14 222/383.1
2006/0175354 A1 * 8/2006 Ophardt ..... A47K 5/1211 222/188
2006/0237483 A1 * 10/2006 Ophardt ..... B05B 11/3066 222/207
2006/0261092 A1 * 11/2006 Ophardt ..... B05B 11/3067 222/181.1

(Continued)

*Primary Examiner* — Matthew J Kasztejna
(74) *Attorney, Agent, or Firm* — Thorpe North & Western, LLP

(57) ABSTRACT

A pump assembly for dispensing flowable materials including a piston chamber-forming member providing an annular chamber about a center post and an annular piston-forming member reciprocally slidable in the annular chamber to dispense flowable material outwardly annularly about the center post.

18 Claims, 8 Drawing Sheets

(56) References Cited

U.S. PATENT DOCUMENTS

| | | | | |
|---|---|---|---|---|
| 2007/0023454 | A1* | 2/2007 | Ophardt | A61L 2/238 222/190 |
| 2007/0138208 | A1* | 6/2007 | Scholz | A47K 5/1204 222/372 |
| 2007/0257064 | A1* | 11/2007 | Ophardt | B05B 11/3069 222/251 |
| 2007/0284394 | A1* | 12/2007 | Ophardt | B05B 11/3001 222/321.7 |
| 2009/0308894 | A1* | 12/2009 | Ophardt | A47K 5/1211 222/190 |
| 2010/0232997 | A1* | 9/2010 | Ophardt | B05B 11/3069 417/559 |
| 2010/0260632 | A1 | 10/2010 | Ophardt et al. | |
| 2011/0240680 | A1* | 10/2011 | Ophardt | B05B 11/3001 222/321.8 |
| 2014/0217123 | A1* | 8/2014 | Ophardt | A47K 5/1217 222/190 |
| 2017/0027391 | A1* | 2/2017 | Jones | B05B 11/0044 |
| 2017/0055782 | A1* | 3/2017 | Ophardt | B05B 11/0086 |
| 2018/0344101 | A1 | 12/2018 | Jones et al. | |
| 2019/0311587 | A1* | 10/2019 | Ophardt | B05B 11/3001 |

* cited by examiner

STATIONARY OUTLET STEM PUMP

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

SCOPE OF THE INVENTION

This invention relates generally to a piston pump for dispensing fluid from a stationary discharge outlet and, particularly, to a simplified construction for such a pump.

BACKGROUND OF THE INVENTION

Stationary stem piston pumps are known in which fluids are is discharged from a stationary discharge outlet carried on a piston chamber-forming body on which a piston-forming element is reciprocally slidable such as in U.S. Pat. No. 8,944,294 to Ophardt et al, issued Feb. 3, 2015 and U.S. Pat. No. 10,144,020 to Ophardt et al, issued Dec. 4, 2018, the disclosures of which is incorporated herein.

The present inventors have appreciated the disadvantage that such known stationary stem piston pumps have relatively complex constructions, requiring a multiple of components.

SUMMARY OF THE INVENTION

To at least partially overcome these disadvantages of previously known devices, the present invention provides a simple construction for a pump assembly for dispensing flowable materials including a piston chamber-forming member providing an annular chamber about a stationary center post and an annular piston-forming member reciprocally slidable in the annular chamber to dispense fluid through the stationary center post.

A preferred embodiment of a pump assembly in accordance with the present invention comprises two basic elements: a piston chamber-forming body and a piston-forming element, and in some embodiments as a third element a one-way inlet valve.

The piston chamber-forming member or body preferably defines a chamber having a radially inwardly directed chamber wall. The body includes a center post member affixed to the body and extending coaxially within the chamber from an inner end of the chamber outwardly to a distal outer end of the post member. The post member includes a center passage open at a discharge outlet at the outer distal end of the center post and extending axially inwardly within the post member to a closed inner end. A transfer port spaced from the discharge outlet extends radially through the post member into the center passage. The inner end of the chamber is in communication with a source of fluid. An annular compartment is defined in the chamber between the chamber wall and the post member. An annular piston-forming element or piston is received in the annular compartment with engagement between the piston and the chamber wall preventing fluid flow outwardly therebetween and engagement between the piston and the post member providing an outlet one-way valve which provides for fluid flow axially outwardly therepast yet prevents fluid flow axially inwardly. A variable volume first compartment is defined between the piston and the body annularly about the post member. Preferably, the first compartment has a volume that increases with movement of the piston axially inwardly in a retraction stroke relative the body and decreases with movement of the piston axially outwardly relative the body in a withdrawal stroke. A one-way inlet valve is provided to permit fluid flow from the source of fluid into the first compartment but to prevent fluid flow from the first compartment to the source of fluid. A second compartment is defined annularly about the post member between the piston and the post member within a central passageway coaxially through the piston. A one-way outlet valve is provided to permit fluid flow from the first compartment to the second compartment but to prevent fluid flow from the second compartment to the first compartment. The one-way outlet valve is preferably provided by an outlet flexing disc carried by the piston that extends radially inwardly from the piston into sliding engagement with the post member axially inwardly of the transfer port. The second compartment is defined radially between the piston and the post member and axially between the outlet flexing disc and a post sealing disc carried by the piston that extends radially inwardly from the piston into sliding engagement with the post member axially outwardly of the transfer port. With reciprocal sliding of the piston in the body within the annular compartment of the chamber, fluid is drawn in the outward withdrawal stroke into the first compartment and is dispensed in the inward retraction stroke from first compartment into the second compartment, from the second compartment through the transfer port into the central passage and through the central passage to be discharged through the discharge outlet.

The axially outer end of the stationary post member may be coupled to a discharge tube to deliver fluid from the discharge outlet via the tube to a distant outlet where the fluid is desired to be dispensed.

In a first embodiment, the chamber is preferably cylindrical and of a constant diameter and has, separate from the piston chamber-forming body and the piston-forming element, the one-way inlet valve between an inner end of the chamber and the source of fluid.

In a second embodiment, the post member is a stepped having an axially inner portion of the post member with a diameter and an axially outer portion of the post member of a diameter less than the diameter of the first portion. The outlet flexing disc slidably engages the outer portion of the post member axially inwardly of the transfer port. The post sealing disc slidably engages the outer portion of post member axially outwardly of the transfer port. The first compartment is defined radially between the piston and the post member and axially between the outlet flexing disc and the one-way inlet valve with the one-way valve provided by an inlet flexing disc carried by the piston that extends radially inwardly from the piston into sliding engagement with the inner portion of the post member. In the second embodiment the inner portion and outer portion of the post member have different diameters effectively providing the first compartment with a stepped cylinder configuration avoiding the need to provide the one-way valve as a separate element from the body and the piston as was the case in the first embodiment.

With each embodiment, the pump may include a dip tube providing communication between an inner end of the chamber and the source of fluid as, for example, to draw fluid upwardly from the bottom of a bottle containing the fluid.

In each embodiment, in a withdrawal stroke, drawback of fluid from the discharge outlet axially inwardly within the center passage can be provided by having the post member have a reduced diameter section slidably engaged by the post sealing disc and an enlarged diameter section with a diameter great than a diameter of the reduced diameter section slidably engaged by the outlet flexing disc.

Preferably, the pump is coupled to a replaceable fluid containing reservoir. After exhaustion of the flowable material contained in the reservoir, the reservoir is replaced, preferably together with a new pump assembly attached. Preferably, both the reservoir and the pump are formed entirely of plastic so as to permit easy recycling of the plastic parts.

As used in the application, the term fluid includes flowable materials which flowable materials include but are not limited to liquids.

In a first aspect, the present invention provides a fluid pump comprising:

a piston chamber-forming member defining a chamber about a chamber axis, the chamber having a radially inwardly directed chamber wall, an inner inlet end and an outer open outlet end, the inlet end of the chamber providing for communication with a source of fluid, the piston chamber-forming member including a center post member extending along the axis coaxially of the chamber outwardly from an axially inner end of the post member to a distal axially outer end of the post member whereby an annular compartment is defined within the chamber between the chamber wall and the post member, the post member having an outer wall coaxial about the axis with a radially outwardly directed post side surface, a center passage provided coaxially within the outer wall of the post member, the center passage open at a discharge outlet at the distal outer end of the post member, the center passage extending axially inwardly from the discharge outlet to a closed axially inner end, a transfer port radially through the outer wall of the post member providing communication from the center passage through the outer wall, an annular piston-forming element having an axially extending tubular stem with a central passageway defined inside a radially inwardly directed inner tube surface, the central passageway open at an axial inner end and open at an axial outer end, the stem including an annular outlet flexing disc extending radially inwardly from the inner tube surface to a central bore axially through the outlet flexing disc, the stem including an annular post sealing disc extending radially inwardly from the inner tube surface to a central bore axially through the post sealing disc, the post sealing disc carried on the stem at a location spaced axially outwardly from outlet flexing disc, the annular piston-forming element coaxially slidably received in the annular compartment for reciprocal movement between a retracted position and an extended position, with: (a) the chamber wall radially outwardly of the piston-forming element, and (b) the post member received coaxially within the central passageway passing through the central bore of the outlet flexing disc and the center bore of the post sealing disc, engagement between the piston-forming element and the chamber wall preventing fluid flow therebetween outwardly or inwardly, the outlet flexing disc about the central bore of the inner disc engaging the post side surface circumferentially thereabout axially inwardly of the transfer port preventing fluid flow axially inwardly between the outlet flexing disc and the post side surface but permitting fluid flow axially outwardly between the outlet flexing disc and the post side surface, the post sealing disc about the central bore of the post sealing disc engaging the post side surface circumferentially thereabout axially outwardly of the transfer port the preventing fluid flow axially outwardly or inwardly between the post sealing disc and the post side surface, a first compartment defined annularly about the post member between the piston chamber-forming member and the piston-forming element, the first compartment having a volume that decreases with sliding of the piston-forming element inwardly relative the piston chamber-forming member and increases with sliding of the piston-forming element outwardly relative the piston chamber-forming member, an inlet one-way valve permitting fluid flow into the first compartment from the source of fluid but preventing fluid flow from the first compartment to the source of the fluid, a second compartment defined annularly about the post member radially between the radially outwardly directed post side surface and the radially inwardly directed inner tube surface and axially between the outlet flexing disc and the post sealing disc, wherein sliding of the piston-forming element inwardly relative the piston chamber-forming member reduces a volume of first compartment with the inlet one-way valve preventing fluid flow from the first compartment to the source of fluid, the engagement between the piston-forming element and the chamber wall preventing fluid flow therebetween outwardly from the first compartment whereby fluid is forced to pass outwardly between the outlet flexing disc and the post member into the second compartment and from the second compartment via the transfer port into the center passage and via the central passage to out the discharge outlet, wherein sliding of the piston-forming element outwardly relative the piston chamber-forming member increases the volume of first compartment drawing fluid through the inlet one-way valve from the source of fluid into the first compartment, with the engagement between the piston-forming element and the chamber wall preventing fluid flow therebetween into the first compartment and the outlet flexing disc engaging the post member to prevent fluid flow axially therebetween axially inwardly into the first compartment from the second compartment.

In a $2^{nd}$ aspect, the present invention provides in accordance with the $1^{st}$ aspect, a fluid pump wherein:

the first compartment defined annularly about the post member axially between the piston chamber-forming member and the piston-forming element inwardly of the engagement between the piston-forming element and the chamber wall and inwardly of the outlet flexing disc, the inlet one-way valve across the inlet end of the chamber permitting fluid flow outwardly but preventing fluid flow inwardly.

In a $3^{rd}$ aspect, the present invention provides in accordance with the $1^{st}$ or $2^{nd}$ aspects, a fluid pump wherein:

the post member having a reduced diameter section with a diameter and an enlarged diameter section with a diameter great than a diameter of the reduced diameter section, the post seal disc slidably engaging the reduced diameter section of the post member, the outlet flexing disc slidably engaging the enlarged diameter section of the post member whereby in the withdrawal stroke fluid within the center passage is drawn through the transfer port into the second compartment.

In a $4^{th}$ aspect, the present invention provides in accordance with the $1^{st}$ aspect, a fluid pump wherein:

the stem including an annular inlet flexing disc extending radially inwardly from the inner tube surface to a central bore axially through the inlet flexing disc, the inlet one-way valve provided by the inlet flexing disc about the central bore of the inlet flexing disc engaging the post side surface of the axially inner portion of the outer wall circumferentially thereabout preventing fluid flow axially inwardly between the inlet flexing disc and the post side surface but permitting fluid flow axially outwardly between the inlet flexing and the post side surface, the first compartment is defined annularly about the post member radially between the radially outwardly directed post side surface and the radially inwardly directed inner tube surface and axially between the inlet flexing disc and the outlet flexing disc.

In a $5^{th}$ aspect, the present invention provides in accordance with the $4^{th}$ aspect, a fluid pump wherein:

the outer portion of the post member having a reduced diameter axially inner section with a diameter and an enlarged diameter axially outer section with a diameter great than a diameter of the reduced diameter section, the post seal disc slidably engaging the reduced diameter section of the post member, the outlet flexing disc slidably engaging the enlarged diameter section of the post member whereby in the withdrawal stroke fluid within the center passage is drawn through the transfer port into the second compartment.

In a $6^{th}$ aspect, the present invention provides in accordance with the $3^{rd}$ and $5^{th}$ aspects, a fluid pump wherein in the fluid within the center passage being drawn through the transfer port into the second compartment fluid within the center passage is drawn axially inwardly in the center passage from the discharge outlet.

In a $7^{th}$ aspect, the present invention provides in accordance with any one of the $1^{st}$ to $6^{th}$ aspects, a fluid pump wherein the stem including an annular chamber sealing disc extending radially outwardly from the stem with a circumferential radially outermost distal edge portion of the chamber sealing disc in engagement with the radially inwardly directed of the side surface of the chamber wall and providing the engagement between the piston-forming element and the chamber wall preventing fluid flow therebetween outwardly or inwardly between chamber sealing disc and the chamber wall axially outwardly or inwardly.

In an $8^{th}$ aspect, the present invention provides in accordance with any one of the $1^{st}$ to $7^{th}$ aspects, a fluid pump wherein the piston-forming element is a unitary element formed of by injection molding.

In a $9^{th}$ aspect, the present invention provides in accordance with any one of the $1^{st}$ to $8^{th}$ aspects, a fluid pump wherein the piston-forming element consists of an elastomeric material.

In a $10^{th}$ aspect, the present invention provides in accordance with any one of the $1^{st}$ to $9^{th}$ aspects, a fluid pump wherein the piston chamber-forming body is a unitary element formed by injection molding.

In an $11^{th}$ aspect, the present invention provides in accordance with any one of the $1^{st}$ to $10^{th}$ aspects, a fluid pump wherein:

the radially outwardly directed post side surface of the post member is generally circular in cross-section normal to the axis.

In a $12^{th}$ aspect, the present invention provides in accordance with any one of the $1^{st}$ to $11^{th}$ aspects, a fluid pump wherein in all positions of the piston-forming element relative the piston chamber-forming member between the retracted position and the extended position the outer end of the post member is axially outwardly of piston-forming element.

In a $13^{th}$ aspect, the present invention provides in accordance with any one of the $1^{st}$ to $12^{th}$ aspects, a fluid pump wherein the stem including an annular engagement disc extending radially outwardly from the stem axially outwardly of the post seal disc for engagement by an actuator member to reciprocally move the annular piston-forming element coaxially relative the annular compartment between the retracted position and the extended position.

In a $14^{th}$ aspect, the present invention provides a fluid pump comprising:

a piston chamber-forming member defining a chamber about a chamber axis, the chamber having a radially inwardly directed chamber wall, an inner inlet end and an outer open outlet end, the inlet end of the chamber providing for communication with a source of fluid, the piston chamber-forming member including a center post member extending along the axis coaxially of the chamber outwardly from an axially inner end of the post member to a distal axially outer end of the post member whereby an annular compartment is defined within the chamber between the chamber wall and the post member, the post member having an outer wall coaxial about the axis with a radially outwardly directed post side surface, a center passage provided coaxially within the outer wall of the post member, the center passage open at a discharge outlet at the distal outer end of the post member, the center passage extending axially inwardly from the discharge outlet to a closed axially inner end, a transfer port radially through the outer wall of the post member providing communication from the center passage through the outer wall, a one-way valve across the inlet end of the chamber permitting fluid flow outwardly but preventing fluid flow inwardly, an annular piston-forming element having an axially extending tubular stem with a central passageway defined inside a radially inwardly directed inner tube surface, the central passageway open at an axial inner end and open at an axial outer end, the stem including an annular outlet flexing disc extending radially inwardly from the inner tube surface to a central bore axially through the outlet flexing disc, the stem including an annular post sealing disc extending radially inwardly from the inner tube surface to a central bore axially through the post sealing disc, the post sealing disc carried on the stem at a location spaced axially outwardly from outlet flexing disc, the annular piston-forming element coaxially slidably received in the annular compartment for reciprocal movement between a retracted position and an extended position, with: (a) the chamber wall radially outwardly of the piston-forming element, and (b) the post member received coaxially within the central passageway passing through the central bore of the outlet flexing disc and the center bore of the post sealing disc, engagement between the piston-forming element and the chamber wall preventing fluid flow therebetween outwardly or inwardly, the outlet flexing disc about the central bore of the inner disc engaging the post side surface circumferentially thereabout axially inwardly of the transfer port preventing fluid flow axially inwardly between the outlet flexing disc and the post side surface but permitting fluid flow axially outwardly between the outlet flexing disc and the post side surface, the post sealing disc about the central bore of the post sealing disc engaging the post side surface circumferentially thereabout axially outwardly of the transfer port the preventing fluid flow axially outwardly or inwardly between the post sealing disc and the post side surface, a first compartment defined within the annularly about the post member axially between the piston chamber-forming member and the piston-forming element inwardly of the engagement between the piston-forming element and the chamber wall and inwardly the outlet flexing disc, the first compartment having a volume that decreases with sliding of the piston-forming element inwardly relative the piston chamber-forming member and increases with sliding of the piston-forming element outwardly relative the piston chamber-forming member, a second compartment defined annularly about the post member radially between the radially outwardly directed post side surface and the radially inwardly directed inner tube surface and axially between the outlet flexing disc and the post sealing disc, wherein sliding of the piston-forming element inwardly relative the piston chamber-forming member reduces a volume of first compartment with the inlet one-way valve preventing fluid flow from the first compartment to the source of fluid, the engagement between the piston-forming element and the chamber wall preventing fluid flow therebetween outwardly from the first compartment whereby fluid is forced to pass outwardly between the outlet flexing disc and the post member into the second compartment and from the second compartment via the transfer port into the center passage and via the central passage to out the discharge outlet, wherein sliding of the piston-forming element outwardly relative the piston chamber-forming member increases the volume of first compartment drawing fluid through the inlet one-way valve from the source of fluid into the first compartment, with the engagement between the piston-forming element and the chamber wall preventing fluid flow therebetween into the first compartment and the outlet flexing disc engaging the post member to prevent fluid flow axially therebetween axially inwardly into the first compartment from the second compartment.

In a $15^{th}$ aspect, the present invention provides a fluid pump comprising:

a piston chamber-forming member defining a chamber about a chamber axis, the chamber having a radially inwardly directed chamber wall, an inner end wall, an inner inlet end and an outer open outlet end, the inlet end of the chamber providing for communication with a source of fluid, the piston chamber-forming member including a center post member extending from the inner end wall along the axis coaxially of the chamber outwardly from an axially inner end of the post member to a distal axially outer end of the post member whereby an annular compartment is defined within the chamber between the chamber wall and the post member, the post member having an outer wall coaxial about the axis with a radially outwardly directed post side surface, the center post member having an axially outer portion having a diameter and an axially inner portion having a diameter greater than the diameter of the outer portion, the post member having an outer wall coaxial about the axis with a radially outwardly directed post side surface, the outer wall having an axially outer portion having a diameter and an axially inner portion having a diameter greater than the diameter of the outer portion, a center passage provided coaxially within the outer wall of the post member, the center passage open at a discharge outlet at the distal outer end of the post member, the center passage extending axially inwardly from the discharge outlet to a closed axially inner end, a transfer port radially through the outer wall of the post member in the outer portion of the outer wall providing communication between the center passage and the annular compartment through the outer wall, an annular piston-forming element having an axially extending tubular stem with a central passageway defined inside a radially inwardly directed inner tube surface, the central passageway open at an axial inner end and open at an axial outer end, the stem including an annular inlet flexing disc extending radially inwardly from the inner tube surface to a central bore axially through the inlet flexing disc, the stem including an annular outlet flexing disc extending radially inwardly from the inner tube surface to a central bore axially through the outlet flexing disc, the outlet flexing disc carried on the stem at a location spaced axially inwardly from the inlet flexing disc, the stem including an annular post sealing disc extending radially inwardly from the inner tube surface to a central bore axially through the post sealing disc, the post sealing disc carried on the stem at a location spaced axially outwardly from the outlet flexing disc, the annular piston-forming element coaxially slidably received in the annular compartment for reciprocal movement between a retracted position and an extended position, with:

(a) the chamber wall radially outwardly of the piston-forming element, (b) the post member received coaxially within the central passageway passing through the central bore of the inlet flexing disc, the central bore of the outlet flexing disc and the center bore of the post sealing disc, (c) engagement between the piston-forming element and the chamber wall preventing fluid flow therebetween outwardly or inwardly, (d) the inlet flexing disc about the central bore of the inlet flexing disc engaging the post side surface of the axially inner portion of the outer wall circumferentially thereabout preventing fluid flow axially inwardly between the inlet flexing disc and the post side surface but permitting fluid flow axially outwardly between the inlet flexing and the post side surface, (e) the outlet flexing disc about the central bore of the outlet flexing disc engaging the post side surface of the axially outer portion of the outer wall circumferentially thereabout axially inwardly of the transfer port preventing fluid flow axially inwardly between the outlet flexing disc and the post side surface but permitting fluid flow axially outwardly between the outlet flexing disc and the post side surface, (f) the post sealing disc about the central bore of the post sealing disc engaging the post side surface of the axially outer portion of the outer wall circumferentially thereabout axially outwardly of the transfer port preventing fluid flow axially outwardly or inwardly between the post sealing disc and the post side surface, wherein:

(g) a first compartment is defined annularly about the post member radially between the radially outwardly directed post side surface and the radially inwardly directed inner tube surface and axially between the inlet flexing disc and the outlet flexing disc, the first compartment having a volume that decreases with sliding of the piston-forming element inwardly relative the piston chamber-and increases with sliding of the piston-forming element outwardly relative the piston chamber-forming member, (h) a second compartment is annularly about the post member radially between the radially outwardly directed post side surface and the radially inwardly directed inner tube surface and axially between the outlet flexing disc and the post sealing disc, (i) sliding of the piston-forming element inwardly relative the piston chamber-forming member reduces the volume of first compartment with the inlet flexing disc preventing fluid flow from the first compartment to the source of fluid, and fluid is forced to pass outwardly between the outlet flexing disc and the post member into the second compartment and from the second compartment via the transfer port into the central passage and via the central passage to out the discharge outlet, (j) sliding of the piston-forming element outwardly relative the piston chamber-forming member increases the volume of first compartment drawing fluid axially outwardly between the transfer disc and the post member from the source of fluid into the first compartment, with the engagement between the piston-forming element and the chamber wall preventing fluid flow therebetween and the inlet flexing disc engaging the post member to prevent fluid flow axially therebetween axially inwardly.

In a $16^{th}$ aspect, the present invention provides in accordance with the $14^{th}$ aspect, a fluid pump wherein the stem including an annular chamber sealing disc extending radially outwardly from the stem with a circumferential radially outermost distal edge portion of the chamber sealing disc in engagement with the radially inwardly directed of the side surface of the chamber wall and providing the engagement between the piston-forming element and the chamber wall preventing fluid flow therebetween outwardly or inwardly between chamber sealing disc and the chamber wall axially outwardly or inwardly.

In a $17^{th}$ aspect, the present invention provides in accordance with the $14^{th}$ or $16^{th}$ aspect, the post member having a reduced diameter section with a diameter and an enlarged diameter section with a diameter greater than a diameter of the reduced diameter section, the post seal disc slidably engaging the reduced diameter section of the post member, the outlet flexing disc slidably engaging the enlarged diameter section of the post member, whereby in the withdrawal stroke fluid within the center passage is drawn through the transfer port into the second compartment.

In a $18^{th}$ aspect, the present invention provides in accordance with the $17^{th}$ aspect, a fluid pump wherein the stem including an annular chamber sealing disc extending radially outwardly from the stem with a circumferential radially outermost distal edge portion of the chamber sealing disc in engagement with the radially inwardly directed of the side surface of the chamber wall and providing the engagement between the piston-forming element and the chamber wall preventing fluid flow therebetween outwardly or inwardly between chamber sealing disc and the chamber wall axially outwardly or inwardly.

In a $19^{th}$ aspect, the present invention provides in accordance with the $15^{th}$ or $18^{th}$ aspect, a fluid pump wherein the outer portion of the post member having a reduced diameter axially inner section with a diameter and an enlarged diameter axially outer section with a diameter great than a diameter of the reduced diameter section, the post seal disc slidably engaging the reduced diameter section of the post member, the outlet flexing disc slidably engaging the enlarged diameter section of the post member, whereby in the withdrawal stroke fluid within the center passage is drawn through the transfer port into the second compartment.

In a $20^{th}$ aspect, the present invention provides in accordance with any one of the $14^{th}$ to $19^{th}$ aspects, a fluid pump wherein in the fluid within the center passage being drawn through the transfer port into the second compartment fluid within the center passage is drawn axially inwardly in the center passage from the discharge outlet.

In a $21^{st}$ aspect, the present invention provides in accordance with any one of the $14^{th}$ to $20^{th}$ aspects, a fluid pump wherein the piston-forming element is a unitary element formed of by injection molding.

In a $22^{nd}$ aspect, the present invention provides in accordance with any one of the $14^{th}$ to $21^{st}$ aspects, a fluid pump wherein the piston-forming element consists of an elastomeric material.

In a $23^{rd}$ aspect, the present invention provides in accordance with any one of the $14^{th}$ to $22^{nd}$ aspects, a fluid pump wherein the piston chamber-forming body is a unitary element formed by injection molding.

In a $24^{th}$ aspect, the present invention provides in accordance with any one of the $14^{th}$ to $23^{rd}$ aspects, a fluid pump wherein:

the radially outwardly directed post side surface of the post member is generally circular in cross-section normal to the axis.

In a $25^{th}$ aspect, the present invention provides in accordance with any one of the $14^{th}$ to $24^{th}$ aspects, a fluid pump wherein in all positions of the piston-forming element relative the piston chamber-forming member between the retracted position and the extended position the outer end of the post member is axially outwardly of piston-forming element.

In a $26^{th}$ aspect, the present invention provides in accordance with any one of the $14^{th}$ to $25^{th}$ aspects, a fluid pump wherein the stem including an annular engagement disc extending radially outwardly from the stem axially outwardly of the post seal disc for engagement by an actuator member to reciprocally move the annular piston-forming element coaxially relative the annular compartment between the retracted position and the extended position.

BRIEF DESCRIPTION OF THE DRAWINGS

Further objects and advantages of the invention will appear from the following description taken together with the accompanying drawings in which.

DETAILED DESCRIPTION OF THE DRAWINGS

Figure 1:
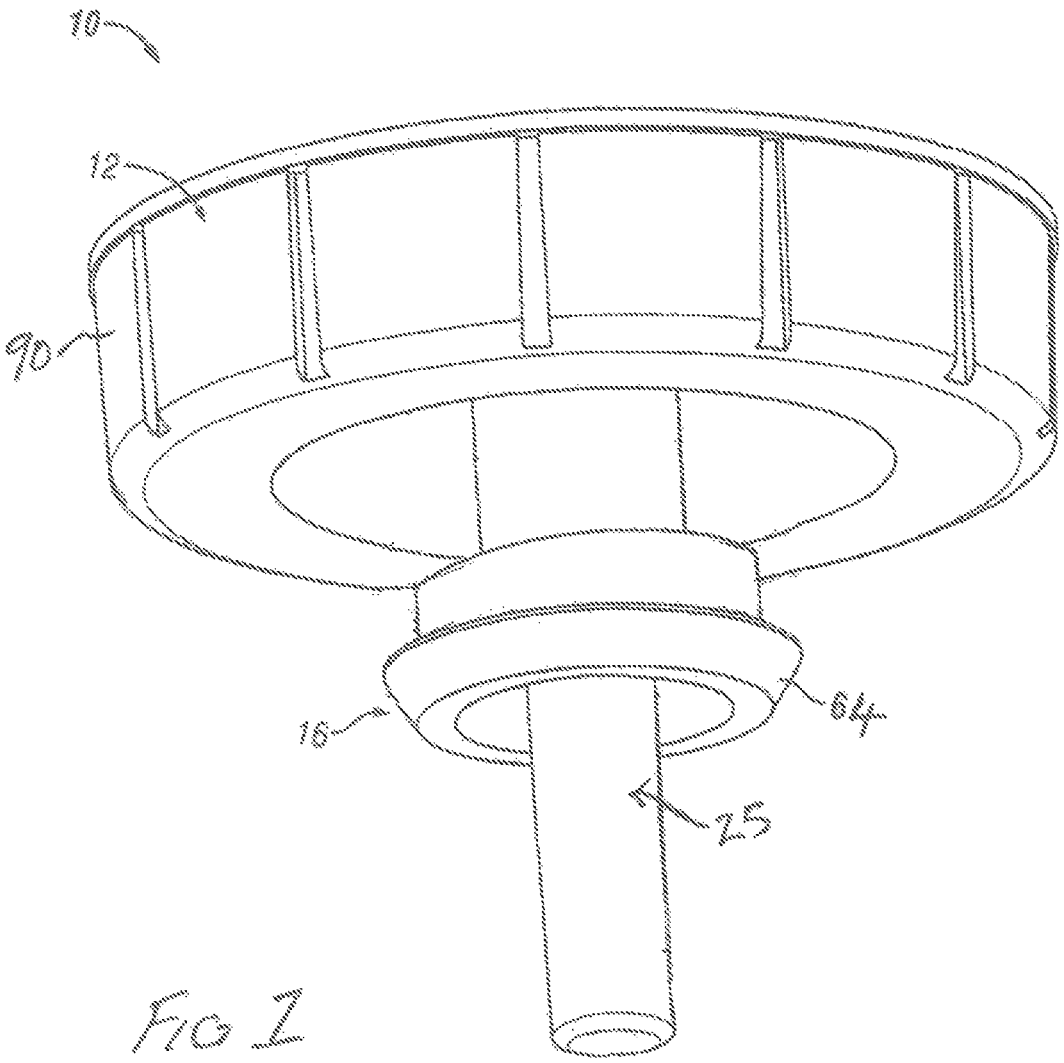
FIG. 1 is a pictorial bottom view of a first embodiment of a pump assembly in accordance with the present invention.
Figure 2:
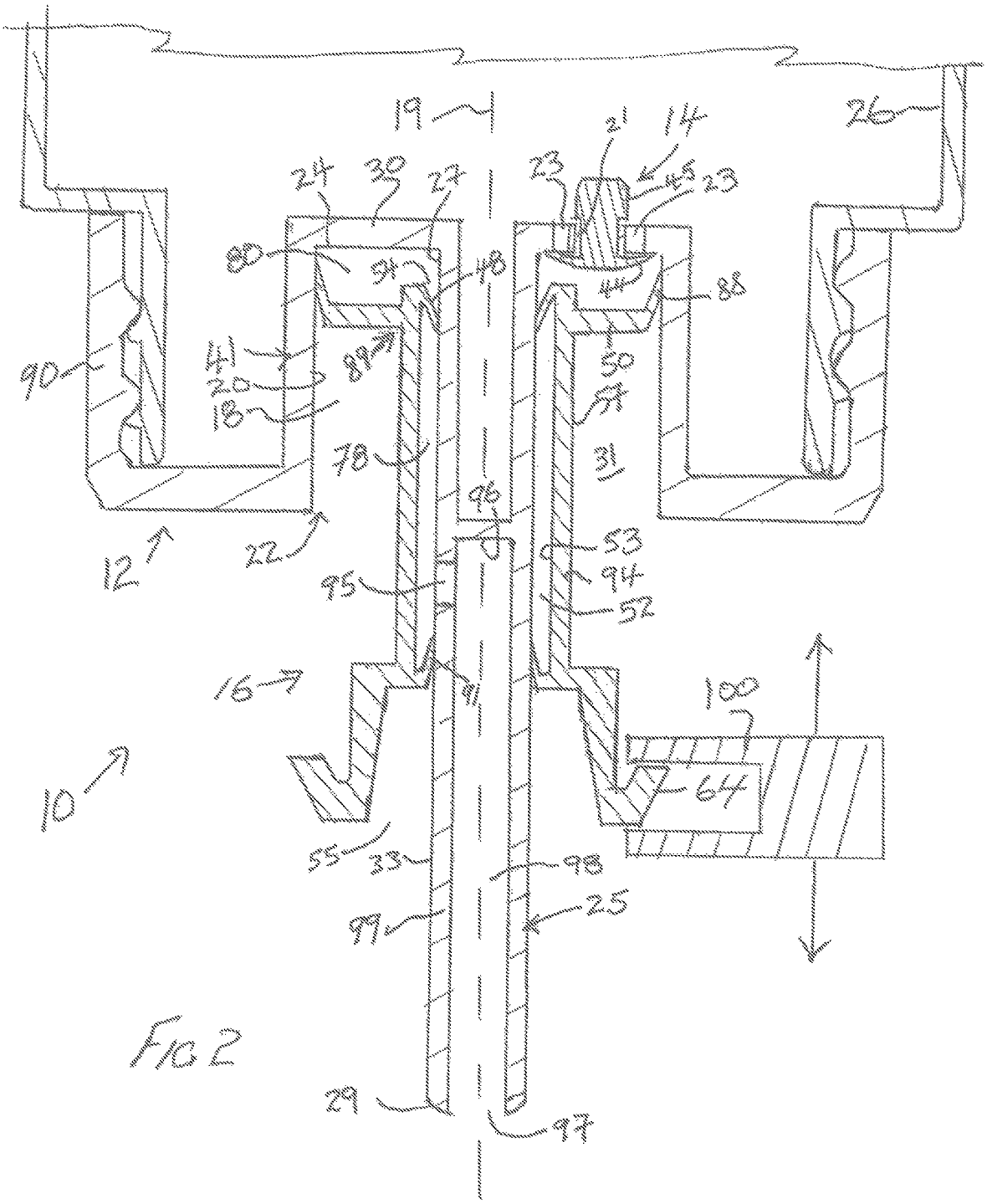
FIG. 2 is a cross-sectional side view of the pump assembly of FIG. 1 schematically shown as attached to a bottle and with the piston in a fully retracted position.
Figure 3:
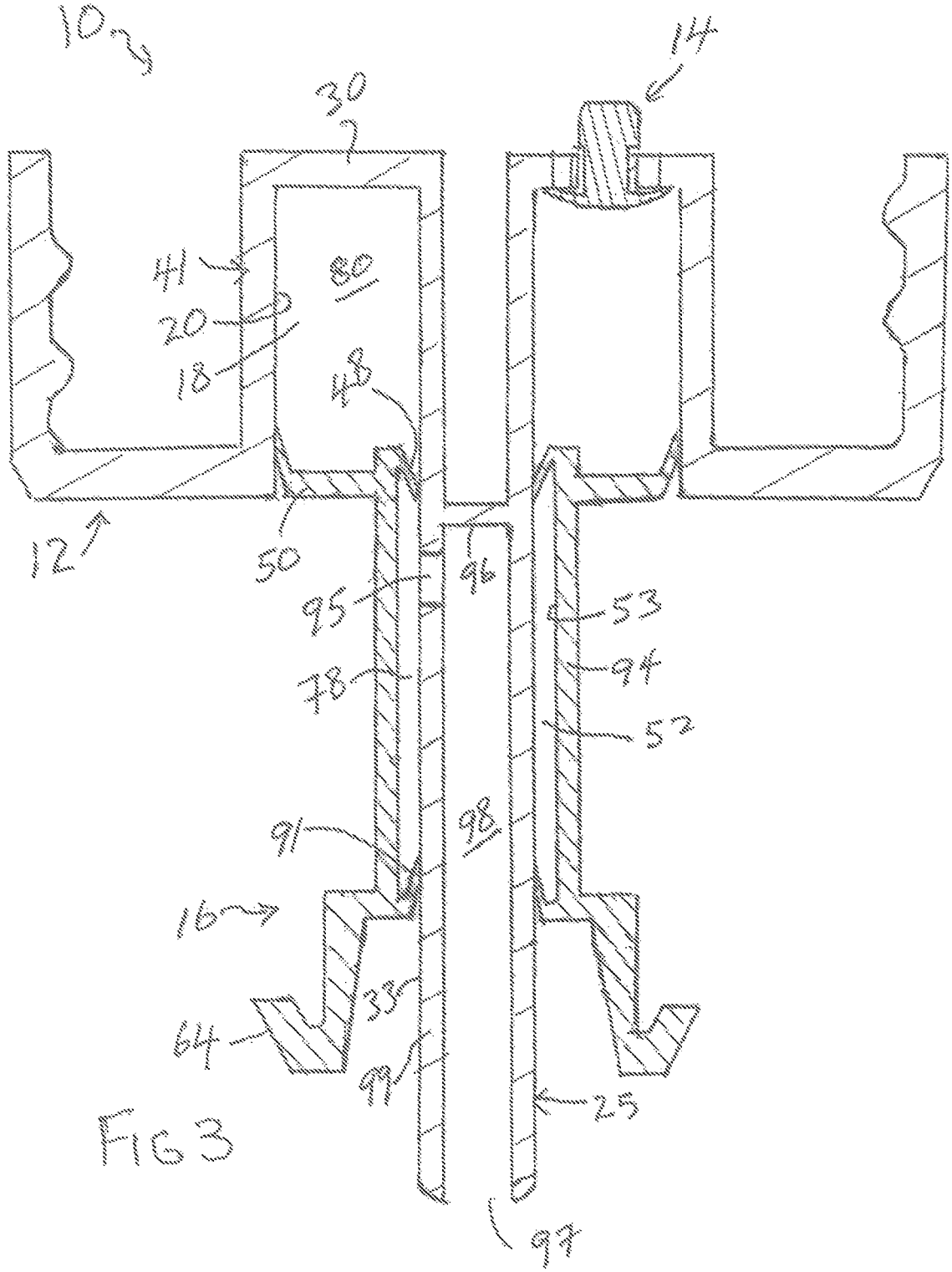
FIG. 3 is a cross-sectional side view the same as FIG. 2 but with the piston in a fully extended position.

Reference is made first to FIGS. 1 to 3 which show a pump assembly 10 in accordance with a first embodiment of this invention. Pump assembly 10 is best shown in FIG. 2 as comprising three principle elements, a piston chamber-forming member or body 12, a one-way valve 14 and a piston-forming element or piston 16.

The body 12 has an inner cylindrical portion 41 defining a cylindrical chamber 18 therein disposed about a central axis 19. The chamber 18 has a radially inwardly directed chamber wall 20, an inner inlet end 24, and an outer open end 22 opening axially outwardly. The inner inlet end 24 of the chamber is closed by an end wall 30 of the body 12, however, with the end wall 30 having fluid inlet openings 23 therethrough providing communication with a source of fluid, shown as a reservoir or bottle 26 in FIG. 2 containing a fluid to be dispensed. The body 12 has a threaded flange 90 to engage a threaded neck on the bottle 26.

Body 12 carries a center post member 25 secured to the end wall 30 of body 12 and extending coaxially centrally of the chamber 18 along the central axis 19.

As seen, the center post member 25 has an axially inner end 27 fixed to the end wall 30 and the center post member 25 extends outwardly from the inner end 27 at the end wall 30 coaxially about the axis 19 to a distal axially outer end 29. The post member 25 has a post outer wall 99 coaxial about the central axis 19 with a radially outwardly directed post side surface 33, which is circular in cross-section normal to the central axis 19.

A center passage 98 is provided coaxially within the post outer wall 99 of the post member 25. The center passage 98 is open at a discharge outlet 97 at the distal axially outer end 29. The center passage 98 extends axially inwardly within the post outer wall 99 from the discharge outlet 97 to a closed axially inner end 96.

An annular compartment 31 is defined within the chamber 18 between the chamber wall 20 and the post side surface 33 of the post member 25. A transfer port 95 extends radially through the post outer wall 99 providing communication from the center passage 98 through the post outer wall 99.

The one-way valve 14 is provided on the end wall 30 of body 12 at the inner inlet end 24 of the chamber 18 to permit fluid flow outwardly through the inlet openings 23 from the bottle 26 into the chamber 18 but prevents fluid flow inwardly back to the bottle 26. As best seen in FIG. 2, the end wall 30 has an aperture 21 therethrough centrally of the inlet openings 23. The one-way valve 14 is best shown in FIG. 2 as having a central stem carrying at an outer end a flexible circular flap 44 and at the inner end an enlarged button 45. With the button 45 on an axially inner side of the end wall 30, the stem passes through the aperture 21 and locates the flap 44 on an axially outer surface of the end wall 30 overlying the fluid inlet openings 23. A circumferentially outer periphery of the circular flap 44 is free to deflect outwardly and thus permit outward flow of fluid from the bottle 26 into chamber 18 when the pressure in the chamber 18 is less that the pressure in the bottle 26. When the pressure in the chamber 18 is greater than the pressure in the bottle 26, the circular flap 44 is urged into the end wall 30 about the inlet openings 23 preventing fluid flow from the chamber 18 inwardly back to the bottle 26.

The piston 16 is annular in shape having an axially extending tubular stem 94 with a central passageway 52 extending coaxially through the piston 16. The passageway 52 is defined radially inside a radially inwardly directed inner tube surface 53 of the stem 94. The passageway 52 extends axially between an open axially inner end 54 of the passageway 52 to an open axially outer end 55 of the passageway 52. The passageway 52 is thus open at the axially inner end 54 and open at the axially outer end 55.

The stem 94 has a radially outwardly directed side surface 57. The stem 94 carries an annular chamber sealing disc 50 extending radially outwardly from the outwardly directed side surface 57 to a distal circular edge portion 88.

The stem 94 carries an annular outlet flexing disc 48 extending radially inwardly from the inner tube surface 53 to a central bore axially through the outlet flexing disc 48.

The stem 94 includes an annular post sealing disc 91 extending radially inwardly from the inner tube surface 53 to a central bore axially through the post sealing disc 91. The post sealing disc 91 is carried on the stem 94 at a location spaced axially outwardly from outlet flexing disc 48.

The annular piston 16 is coaxially slidably received in the annular compartment 31 of the chamber 18 for reciprocal movement between a retracted position shown in FIG. 2 and an extended position shown in FIG. 3 with (a) the chamber wall 20 radially outwardly of the piston 16 and (b) the post member 25 received coaxially in the passageway 52 passing through the central bore of the outlet flexing disc 48 and the central bore of the post sealing disc 91.

With the annular piston 16 coaxially slidably received in the annular compartment 31 of the chamber 18, engagement between the piston 16 and the chamber wall 20 prevents fluid flow therebetween axially inwardly and outwardly. In this regard, the distal circular edge portion 88 of the chamber sealing disc 50 circumferentially engages the chamber wall 20 so as to substantially prevent fluid flow therebetween inwardly and outwardly therepast. The chamber sealing disc 50 and preferably its distal circular edge portion 88 is preferably resilient assuming an unbiased configuration and when deflected to deflected configurations has an inherent bias to return to the unbiased configuration. The chamber sealing disc 50 may preferably, when unbiased, extend radially outwardly farther than the chamber wall 20 as, in effect, to provide a radially outwardly directed surface which engages the chamber wall 20.

With the annular piston 16 coaxially slidably received in the annular compartment 31 of the chamber 18, the outlet flexing disc 48 about the central bore of the outlet flexing disc 48 engages the post side surface 33 circumferentially thereabout axially inwardly of the transfer port 95 preventing fluid flow axially inwardly between the outlet flexing disc 48 and the post side surface 33 but permitting fluid flow axially outwardly between the outlet flexing disc 48 and the post side surface 33. The outlet flexing disc 48 extends radially inwardly from the inwardly directed inner tube surface 53 of the stem 94. The outlet flexing disc 48 is sized to circumferentially engage the cylindrical radially outwardly directed post side surface 33 of the post member 25. The outlet flexing disc 48 preferably extends radially inwardly with an elastically deformable edge portion circumferentially about the central bore of the outlet flexing disc 48 engaging the post side surface 33 of the post member 25 circumferentially thereabout to form a first one-way outlet valve 89. The outlet flexing disc 48 extends radially inwardly and axially outwardly and has an inherent bias biasing it radially inwardly into engagement with the post side surface 33 of the post member 25. The bias of the outlet flexing disc 48 substantially prevents fluid flow in the chamber 18 between the outlet flexing disc 48 and the post member 25 in an inward direction, however the outlet flexing disc 48 permits fluid flow between the outlet flexing disc 48 and the post member 25 in an outward direction by the outlet flexing disc 48 elastically deforming against its inherent bias away from the post side surface 33 of the post member 25. The outlet flexing disc 48 is elastically deformed away from the post side surface 33 when the pressure on an axially inner side of the outlet flexing disc 48 is sufficiently greater that the pressure on an axially outer side of the outlet flexing disc 48.

The outlet flexing disc 48 is deformed when the pressure differential across it, that is, the difference between the pressure on its axially inner side and pressure on its axially outer side, is greater than a maximum pressure differential which the outlet flexing disc 48 can withstand without deflecting.

The post sealing disc 91 about the central bore of the post sealing disc 91 engages the post side surface 33 of the center post 25 circumferentially thereabout axially outwardly of the transfer port 95 preventing fluid flow both axially outwardly and axially inwardly between the post sealing disc 91 and the post side surface 33.

The post sealing disc 91 extends radially inwardly from the inwardly directed inner tube surface 53 of the stem 94. The post sealing disc 91 is sized to circumferentially engage the cylindrical radially outwardly directed post side surface 33 of the post member 25 axially outwardly of the transfer port 95. The post sealing disc 91 preferably extends radially inwardly with an elastically deformable edge portion circumferentially about the central bore of the post sealing disc 91 engaging the post side surface 33 of the post member 25 circumferentially thereabout axially outwardly of the transfer port 95. The port sealing disc 91 preferably extends radially inwardly and axially inwardly and has an inherent bias biasing it radially inwardly into engagement with the post side surface 33 of the post member 25. The bias of the post sealing disc 91 substantially prevents fluid flow in the chamber 18 between the post sealing 91 and the post member 25 in both an axially inward direction and an axially outer direction.

A first compartment 80 is defined axially between body 12 and the piston 16. The first compartment 80 is inwardly of the engagement between the piston 16 and the chamber wall 20 at the chamber sealing disc 50, and inwardly the outlet flexing disc 48. The first compartment 80 has a volume that decreases with sliding of the piston 16 axially inwardly relative the body 12 and increases with sliding of the piston 16 axially outwardly relative the body 12. The first compartment 80 is annular about the post member 25.

A second compartment 78 is defined annularly about the post member 25 radially between the radially outwardly directed post side surface 33 and the radially inwardly directed inner tube surface 53 and axially between the outlet flexing disc 48 and the post sealing disc 91. In the first embodiment, the second compartment 78 has a volume that does not change with sliding of the piston 16 inwardly and outwardly relative the body 12. The second compartment 78 is in communication with the center passage 98 via the transfer port 95, the second compartment is annular about the post member 25.

Sliding of the piston 16 inwardly relative the body 12 reduces a volume of the first compartment 80 with the inlet one-way valve 14 preventing fluid flow from the first compartment 80 to the bottle 86 and the engagement between the piston 16 and the chamber wall 18 preventing fluid flow therebetween outwardly from the first compartment 80, and fluid is forced to pass outwardly between the outlet flexing disc 48 and the post member 25 into the second compartment 78 and from the second compartment 78 via the transfer port 95 into the center passage 98 inside the stem 94 and via the center passage 98 to out the discharge outlet 97.

Sliding of the piston 16 outwardly relative the body 12 increases the volume of first compartment 80 drawing fluid through the inlet one-way valve 14 from the bottle 26 into the first compartment 80, with the engagement between the piston 16 and the chamber wall 20 preventing fluid flow therebetween into the first compartment 80 due to the chamber sealing disc 50, and the outlet flexing disc 48 engaging the post member 25 to prevent fluid flow axially therebetween axially inwardly into the first compartment 80 from the second compartment 78.

The annular piston 16 is axially slidably received in the annular compartment 31 of the chamber 18 for reciprocal coaxial sliding movement inwardly and outwardly relative the body 12 to draw fluid from the bottle 26 in a withdrawal stroke and to discharge fluid out through piston 16.

An engagement member shown in the form of an engagement disc 64 is provided on the stem 94 of the piston 16 extending radially outwardly. The engagement disc 64 is carried on the stem 94 at a location spaced axially outwardly from post sealing disc 91. The engagement member is adapted to be engaged by an actuator mechanism 100 only schematically shown on FIG. 2, to reciprocally move the piston 16 axially relative the body 12 as indicated by the arrows. The stem 94 extends outwardly through the outer open end 22 of the chamber 18 and preferably presents the discharge outlet 27 and the engagement disc 64 on the stem 94 axially outwardly from the outer open end 22 of the chamber 18, for example, for ease of coupling to and uncoupling from the actuator mechanism 100, and to place the discharge outlet 97 spaced from the body 12.

Operation of the pump assembly 10 in a cycle of operation is now described with particular reference to FIGS. 2 and 3. FIG. 2 shows the pump assembly 10 with piston 16 in a fully retracted position relative the body 14. FIG. 3 shows the pump assembly 10 with piston 16 in a fully withdrawn position relative the body 14. Repeated pumping action results by repeatedly cycling the pump assembly between the positions of FIGS. 2 and 3.

During the withdrawal stroke of moving from the retracted position of FIG. 2 to the extended position of FIG. 3, the withdrawal of the piston 16 causes the volume of the first compartment 80 to increase creating a vacuum in the first compartment 80 causing the inlet one-way valve 14 to open with fluid to flow into first compartment 80 from the bottle 26 past the flap 44 of the inlet one-way valve 14. In the withdrawal stroke, the outlet flexing disc 48 prevents fluid flow inwardly into the first compartment 80 from the second compartment 78 and the chamber sealing disc 50 also prevents fluid flow inwardly into the first compartment 80 permitting the creation of the vacuum in the first compartment 80 to unseat the flap 44 of the inlet one-way valve 14 and draw fluid into the first compartment 80 past the flap 44 of the inlet one-way valve 14.

During the retraction stroke, in moving from the extended position of FIG. 3 to the retracted position of FIG. 2, the axial inward movement of the piston 16 pressurizes fluid in the first compartment 80 between the piston 16 and the body 12. The pressure urges flap 44 of the inlet one-way valve 14 to a closed position abutting end wall 30. As a result of this pressure in the first compartment 80, the outlet flexing disc 48 deflects so as to come out of sealing engagement with the post side surface 33 of the post member 25 and to permit fluid to flow past the outlet flexing disc 48 out of the first compartment 80 into the second compartment 78 and hence via the second compartment 78 to the transfer port 95, through the transfer port 95 into the center passage 98 within the center post 25 and axially via the center passage 98 to out the discharge outlet 97.

While the preferred embodiment of FIG. 2 shows a generally cylindrical chamber 18 and piston 16 which have engagement surfaces as being circular in cross-section, complementary chambers and pistons of other symmetrical and non-symmetrical cross-sectional shapes may also be used.

Figure 4:
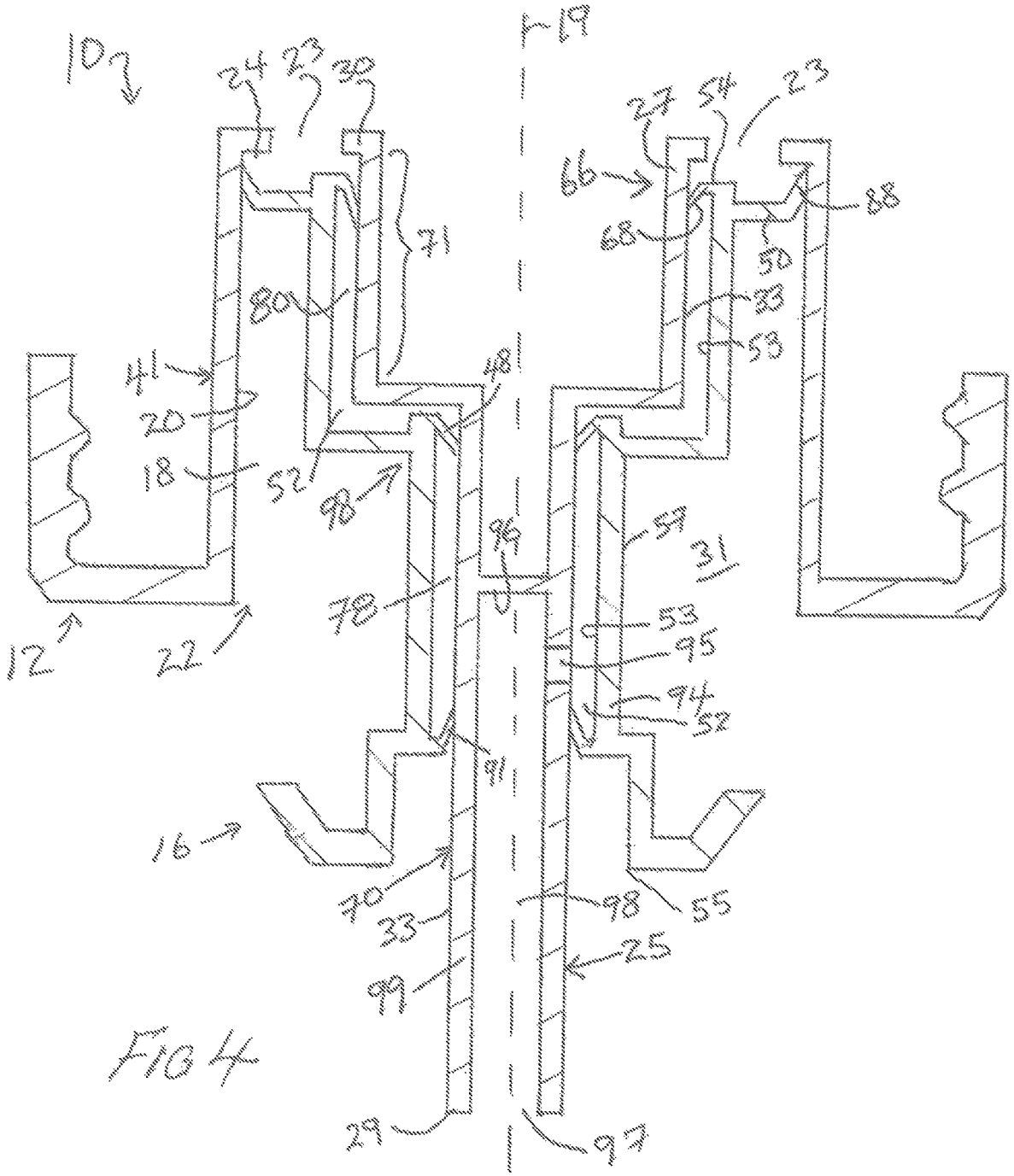
FIG. 4 is a cross-sectional side view of a second embodiment of a pump assembly in accordance with the present invention with the piston in a fully retracted position.
Figure 5:
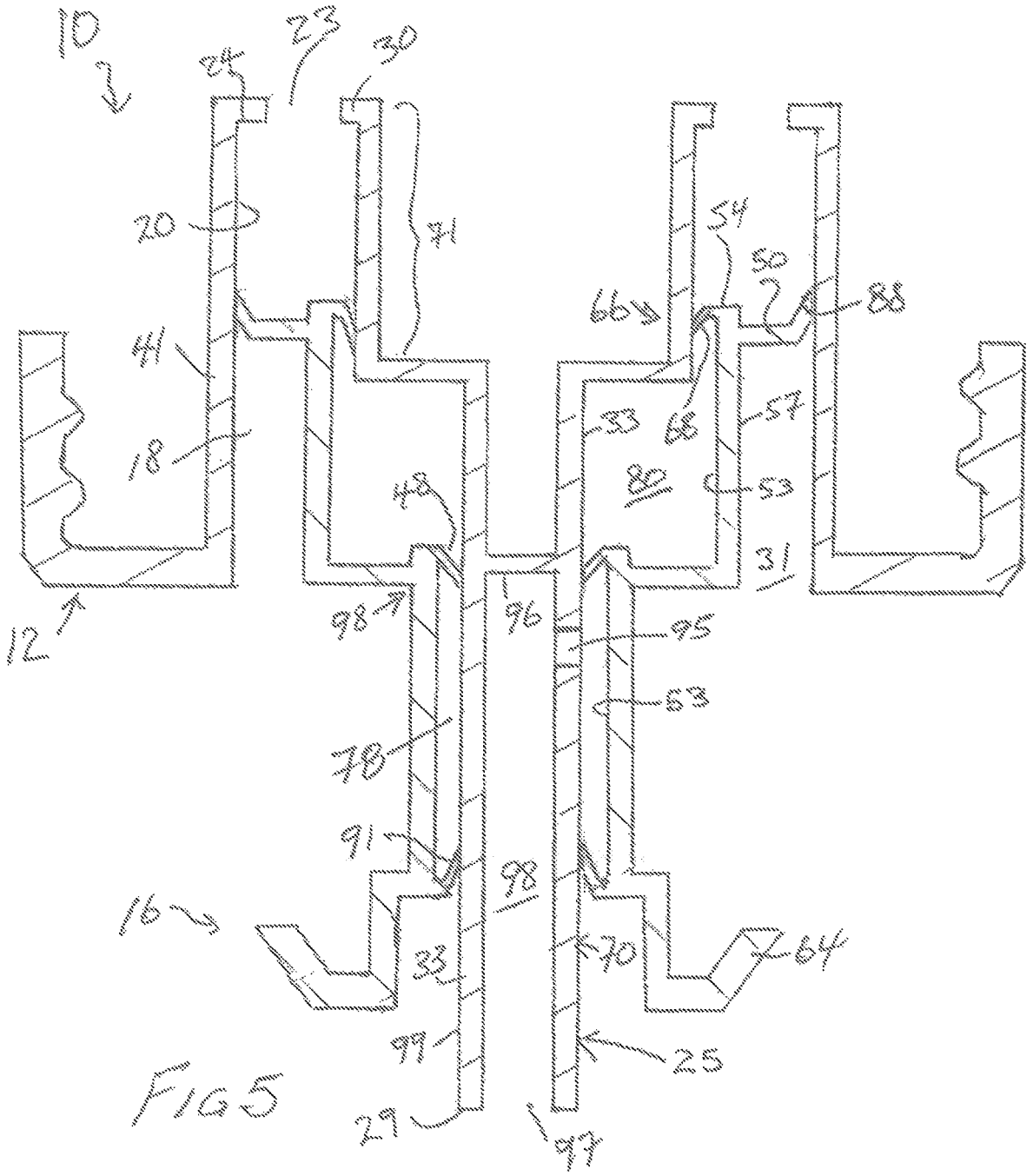
FIG. 5 is a cross-sectional side view the same as FIG. 4 but with the piston in a fully extended position.

Reference is now made to FIGS. 4 and 5 which show a second embodiment of a pump in accordance with the present invention. In FIGS. 4 and 5 and all the figures, similar reference numerals are used to indicate similar elements to those in the first embodiment of FIGS. 1 to 3.

FIGS. 4 and 5 which show a pump assembly 10 in accordance with the second embodiment of this invention. Pump assembly 10 is shown in FIGS. 4 and 5 as comprising two principle elements, namely a piston chamber-forming member or body 12, and a piston-forming element or piston 16.

The body 12 has an inner cylindrical portion 41 defining a cylindrical chamber 18 therein disposed about a central axis 19. The chamber 18 has a radially inwardly directed chamber wall 20, an inner inlet end 24, and an outer open end 22 opening axially outwardly. The inner inlet end 24 of the chamber carries an end wall 30 of the body 12, however, with the end wall 30 having fluid inlet openings 23 therethrough providing communication with a source of fluid, for example, such as bottle 26 as shown in FIG. 2 containing a fluid to be dispensed.

Body 12 carries a center post member 25 secured to the end wall 30 of body 12 and extending coaxially centrally of the chamber 18 along the central axis 19.

As seen, the center post member 25 has an axially inner end 27 fixed to the end wall 30 and the center post member 25 extends outwardly from the inner end 27 of the end wall 30 coaxially about the central axis 19 to a distal axially outer end 29. The post member 25 has a post outer wall 99 coaxial about the central axis 19 with a radially outwardly directed post side surface 33, which is circular in cross-section normal to the central axis 19. The center post member 25 has an axially outer portion 70 having a diameter and an axially inner portion 71 having a diameter greater than the diameter of the outer portion 70. A center passage 98 is provided coaxially within the post outer wall 99 of the post member 25. The center passage 98 is open at a discharge outlet 97 at the distal axially outer end 29. The center passage 98 extends axially inwardly within the post outer wall 99 from the discharge outlet 97 to a closed axially inner end 96.

An annular compartment 31 is defined within the chamber 18 between the chamber wall 20 and the post side surface 33 of the post member 25. A transfer port 95 extends radially through the post outer wall 99 providing communication from the center passage 98 through the post outer wall 99.

The piston 16 is annular in shape having an axially extending tubular stem 94 with a central passageway 52 extending coaxially through the piston 16. The passageway 52 is defined radially inside a radially inwardly directed inner tube surface 53 of the stem 94. The passageway 52 extends axially between an open axially inner end 54 of the passageway 52 to an open axially outer end 55 of the passageway 52. The passageway 52 is thus open at the axially inner end 54 and open at the axially outer end 55.

The stem 52 has a radially outwardly directed side surface 57. The stem 94 carries an annular chamber sealing disc 50 extending radially outwardly from the outwardly directed side surface 57 to a distal circular edge portion 88.

The stem 94 carries an annular inlet flexing disc 68 extending radially inwardly from the inner tube surface 53 to a central bore axially through the inlet flexing disc 68.

The stem 94 carries an annular outlet flexing disc 48 extending radially inwardly from the inner tube surface 53 to a central bore axially through the outlet flexing disc 48. The outlet flexing disc 48 is carried on the stem 94 at a location spaced axially outwardly from inlet flexing disc 68.

The stem 94 includes an annular post sealing disc 91 extending radially inwardly from the inner tube surface 53 to a central bore axially through the post sealing disc 91. The post sealing disc 91 is carried on the stem 94 at a location spaced axially outwardly from outlet flexing disc 48.

The annular piston 16 is coaxially slidably received in the annular compartment 31 of the chamber 18 for reciprocal movement between a retracted position shown in FIG. 4 and an extended position shown in FIG. 5 with (a) the chamber wall 20 radially outwardly of the piston 16, and (b) the post member 25 received coaxially in the passageway 52 passing through the central bore of the inlet flexing disc 68, the central bore of the outlet flexing disc 48, and the central bore of the post sealing disc 91.

With the annular piston 16 coaxially slidably received in the annular compartment 31 of the chamber 18, engagement between the piston 16 and the chamber wall 20 prevents fluid flow therebetween axially inwardly and outwardly. In this regard, the distal circular edge portion 88 of the chamber sealing disc 50 circumferentially engages the chamber wall 20 so as to substantially prevent fluid flow therebetween inwardly and outwardly therepast. The chamber sealing disc 50 and preferably its distal circular edge portion 88 is preferably resilient assuming an unbiased configuration and when deflected to deflected configurations has an inherent bias to return to the unbiased configuration. The chamber sealing disc 50 may preferably, when unbiased, extend radially outwardly farther than the chamber wall 20 as, in effect, to provide a radially outwardly directed surface which engages the chamber wall 20.

With the annular piston 16 coaxially slidably received in the annular compartment 31 of the chamber 18, the inlet flexing disc 68 about the central bore of the inlet flexing disc 68 engages the post side surface 33 circumferentially thereabout over the inner portion 71 of the center post 25 preventing fluid flow axially inwardly between the inlet flexing disc 68 and the post side surface 33 but permitting fluid flow axially outwardly between the inlet flexing disc 68 and the post side surface 33. The inlet flexing disc 68 extends radially inwardly from the inwardly directed inner tube surface 53 of the passageway 52. The inlet flexing disc 68 is sized to circumferentially engage the cylindrical radially outwardly directed post side surface 33 of the post member 25 over the inner portion 71. The inlet flexing disc 68 preferably extends radially inwardly with an elastically deformable edge portion circumferentially about the central bore engaging the post side surface 33 of the post member 25 circumferentially thereabout to form a one-way inlet valve 66. The inlet flexing disc 68 extends radially inwardly and axially outwardly and has an inherent bias biasing it radially inwardly into engagement with the post side surface 33 of the post member 25. The bias of the inlet flexing disc 68 substantially prevents fluid flow in the chamber 18 between the inlet flexing disc 68 and the post member 25 in an inward direction, however, the inlet flexing disc 68 permits fluid flow between the inlet flexing disc 68 and the post member 25 in an outward direction by the inlet flexing disc 68 elastically deforming against its inherent bias away from the post side surface 33 of the post member 25. The inlet flexing disc 68 is elastically deformed away from the post side surface 33 when the pressure on an axially inner side of the inlet flexing disc 68 is sufficiently greater that the pressure on an axially outer side of the inlet flexing disc 68.

The inlet flexing disc 68 is deformed when a pressure differential across it, that is, a difference between the pressure on its axially inner side and pressure on its axially outer side, is greater than a maximum pressure differential which the inlet flexing disc 68 can withstand without deflecting.

With the annular piston 16 coaxially slidably received in the annular compartment 31 of the chamber 18, the outlet flexing disc 48 about the central bore of the outlet flexing disc 48 engages the post side surface 33 circumferentially thereabout over the outer portion 70 of the center post 25 axially inwardly of the transfer port 95 preventing fluid flow axially inwardly between the outlet flexing disc 48 and the post side surface 33 but permitting fluid flow axially outwardly between the outlet flexing disc 48 and the post side surface 33. The outlet flexing disc 48 extends radially inwardly from the inwardly directed inner tube surface 53 of the passageway 52. The outlet flexing disc 48 is sized to circumferentially engage the cylindrical radially outwardly directed post side surface 33 of the post member 25. The outlet flexing disc 48 extends radially inwardly with an elastically deformable edge portion circumferentially about the central bore engaging the post side surface 33 of the post member 25 circumferentially thereabout to form a first one-way outlet valve 89. The outlet flexing disc 48 preferably extends radially inwardly and axially outwardly and has an inherent bias biasing it radially inwardly into engagement with the post side surface 33 of the post member 25. The bias of the outlet flexing disc 48 substantially prevents fluid flow in the chamber 18 between the outlet flexing disc 48 and the post member 25 in an inward direction, however, the outlet flexing disc 48 permits fluid flow between the outlet flexing disc 48 and the post member 25 in an outward direction by the outlet flexing disc 48 elastically deforming against its inherent bias away from the post side surface 33 of the post member 25. The outlet flexing disc 48 is elastically deformed away from the post side surface 33 when the pressure on an axially inner side of the outlet flexing disc 48 is sufficiently greater that the pressure on an axially outer side of the outlet flexing disc 48.

The outlet flexing disc 48 is deformed when a pressure differential across it, that is, a difference between the pressure on its axially inner side and pressure on its axially outer side, is greater than a maximum pressure differential which the outlet flexing disc 48 can withstand without deflecting.

The post sealing disc 91 about the central bore of the post sealing disc 91 engages the post side surface 33 of the center post 25 circumferentially thereabout over the outer portion 70 of the center post 25 axially outwardly of the transfer port 95 preventing fluid flow axially outwardly or inwardly between the post sealing disc 91 and the post side surface 33.

The post sealing disc 91 extends radially inwardly from the inwardly directed inner tube surface 53 of the passageway 52. The post sealing disc 91 is sized to circumferentially engage the cylindrical radially outwardly directed post side surface 33 of the post member 25 axially outwardly of the transfer port 95. The post sealing disc 91 extends radially inwardly with an elastically deformable edge portion circumferentially about the central bore of the post sealing disc 91 engaging the post side surface 33 of the post member 25 circumferentially thereabout axially outwardly of the transfer port 95. The post sealing disc 91 preferably extends radially inwardly and axially inwardly and has an inherent bias biasing it radially inwardly into engagement with the post side surface 33 of the post member 25. The bias of the post sealing disc 91 substantially prevents fluid flow in the chamber 18 between the post sealing 91 and the post member 25 in both an axially inward direction and an axially outer direction.

A first compartment 80 is defined within the central passageway 52 annularly about the post member 25 radially between the radially outwardly directed post side surface 33 and the radially inwardly directed inner tube surface 53 and axially between the inlet flexing disc 68 and the outlet flexing disc 48. Due to the inner portion 71 of the center post 25 having a diameter greater than the diameter of the outer portion 70 of the center post 25, the first compartment 80 has a volume that decreases with sliding of the piston 16 axially inwardly relative the body 12 and increases with sliding of the piston 16 axially outwardly relative the body 12.

A second compartment 78 is defined within the central passageway 52 annularly about the post member 25 radially between the radially outwardly directed post side surface 33 and the radially inwardly directed inner tube surface 53 and axially between the outlet flexing disc 48 and the post sealing disc 91. In the second embodiment, the second compartment 78 has a volume that does not change with sliding of the piston 16 inwardly and outwardly relative the body 12. The second compartment 78 is in communication with the center passage 98 via the via the transfer port 95. Sliding of the piston 16 inwardly relative the body 12 reduces a volume of the first compartment 80 with the inlet one-way valve 66 preventing fluid flow from the first compartment 80 to the bottle 86 and the engagement between the piston 16 and the chamber wall 18 preventing fluid flow therebetween outwardly from the first compartment 80, and fluid is forced to pass outwardly between the outlet flexing disc 48 and the post member 25 into the second compartment 78 and from the second compartment 78 via the transfer port 95 into the center passage 98 inside the stem 94 and via the center passage 98 to out the discharge outlet 97.

Sliding of the piston 16 outwardly relative the body 12 increases the volume of first compartment 80 drawing fluid through the one-way inlet valve 66 from the bottle 26 into the first compartment 80, that is axially outwardly between the inlet flexing disc 68 and the center post 25, with the outlet flexing disc 48 engaging the post member 25 to prevent fluid flow axially therebetween axially inwardly into the first compartment 80 from the second compartment 78. More particularly, fluid is drawn from the bottle through the inlet outlets 23 into the chamber 18, between the outlet flexing disc 48 and the post member 25 into the first compartment 80.

The annular piston 16 is axially slidably received in the annular compartment 31 of the chamber 18 for reciprocal coaxial sliding movement inwardly and outwardly relative the body to draw fluid from the bottle 26 in a withdrawal stroke and to discharge fluid out through the tube member 25.

An engagement member shown in the form of an engagement disc 64 is provided on the stem 94 of the piston 16 extending radially outwardly. The engagement disc 64 is carried on the stem 94 at a location spaced axially outwardly from outlet sealing disc 91. The engagement member is adapted to be engaged by an actuator mechanism 100 only schematically shown on FIG. 2, to reciprocally move the piston 16 axially relative the body 14. The stem 94 extends outwardly through the outer open end 22 of the chamber 18 and preferably presents the engagement disc 64 on the stem 94 axially outwardly from the outer open end 22 of the chamber 18 for ease of coupling to and uncoupling from the actuator mechanism 100.

Operation of the pump assembly 10 in a cycle of operation is now described with particular reference to FIGS. 4 and 5. FIG. 4 shows the pump assembly 10 with piston 16 in a fully retracted position relative the body 14. FIG. 5 shows the pump assembly 10 with piston 16 in a fully withdrawn position relative the body 14. Repeated pumping action results by repeatedly cycling the pump assembly between the positions of FIGS. 4 and 5.

During the withdrawal stroke of moving from the retracted position of FIG. 4 to the extended position of FIG. 5, the withdrawal of the piston 16 causes the volume of the first compartment 80 to increase creating a vacuum causing the inlet one-way valve 66 to open with fluid to flow into first compartment 80 from the bottle 26 between the inlet flexing disc 68 and the post member 25. In the withdrawal stroke, the outlet flexing disc 48 prevents fluid flow inwardly into the first compartment 80 from the second compartment 78 assisting in creating the vacuum in the first compartment 80 to unseat the center bore of the inlet flexing disc 68 and draw fluid into the first compartment 80 between the inlet flexing disc 68 and the post member 25.

During the retraction stroke in moving from the extended position of FIG. 5 to the retracted position of FIG. 4, the axial inward movement of the piston 16 pressurizes fluid in the first compartment 80. This pressure urges the center bore of the inlet flexing disc 68 into the post member 25. As a result of this pressure in the first compartment 80, the outlet flexing disc 48 deflects so as to come out of sealing engagement with the post side surface 33 of the post member 25 and to permit fluid to flow past the outlet flexing disc 48 and out of the first compartment 80 into the second compartment 78 and hence via the second compartment 78 to the transfer port 95, through the transfer port 95 into the center passage 98 within the center post 25 and axially via the center passage 98 to out the discharge outlet 97.

The bottle 26 is preferably collapsible such that it will collapse on dispensing fluid from the bottle 26, however, non-collapsible containers may be used with venting to prevent an excessive vacuum from developing in the bottle 26.

Figure 6:
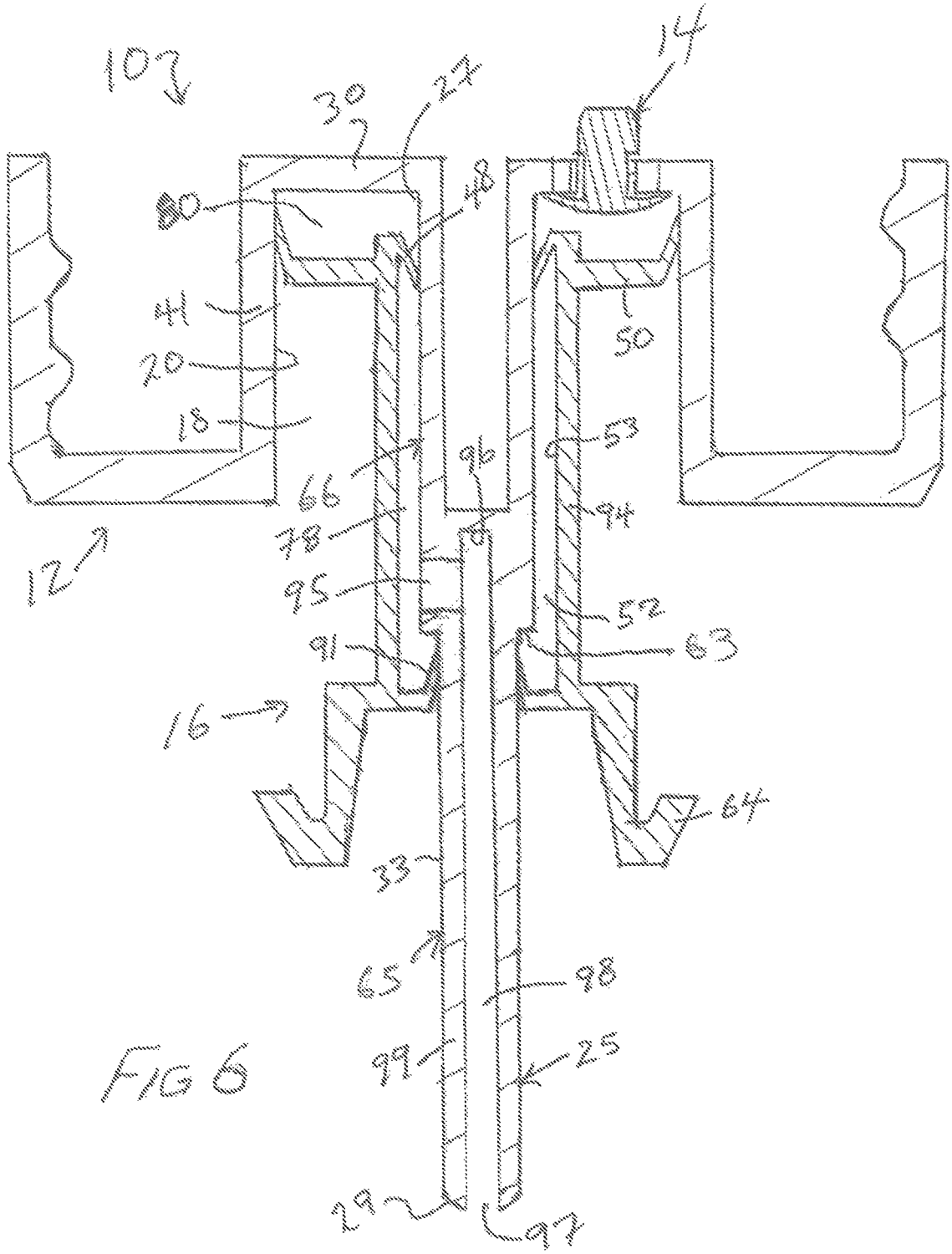
FIG. 6 is a cross-sectional side view of a third embodiment of a pump assembly in accordance with the present invention with the piston in a fully retracted position.

Reference is made to FIG. 6 which shows a third embodiment of a pump assembly 10 in accordance with the present invention. The third embodiment of FIG. 6 is identical to the second embodiment of the pump assembly 10 shown in FIG. 2 but for the differences that the post member 25 has a lesser diameter outer section 65 of a diameter and an enlarged diameter section 66 of a diameter greater than the diameter of the reduced diameter section 65. As can be seen on FIG. 6, the post member 25 is shown to have but two different sections of different diameters with the lesser diameter outer section 65 extending from the outer end 29 of the post member 25 to a shoulder 63 and the enlarged diameter inner section 66 extending from the shoulder 63 to the inner end 27 of the post member 25. The outlet flexing disc 48 slides on and slidably engages the enlarged diameter inner section 66. The post sealing disc 91 slides on and sealably engages on the reduced diameter outer section 65. With this arrangement, the volume of the second compartment 78 increases in the withdrawal stroke and decreases in the retraction stroke. In the withdrawal stroke, due to the increase in the volume of the second compartment 78, fluid is drawn into the second compartment 78 from the center passage 98 via the transfer port 95 and in the drawing of fluid from the center passage 98 through the transfer port 95 into the second compartment 78 fluid in the center passage 98 is drawn axially inwardly from the discharge outlet 97 which has the advantage of reducing volume of fluid within the center passage 98 and/or near to the discharge outlet 97 that is available to drip out the discharge outlet 97.

Figure 7:
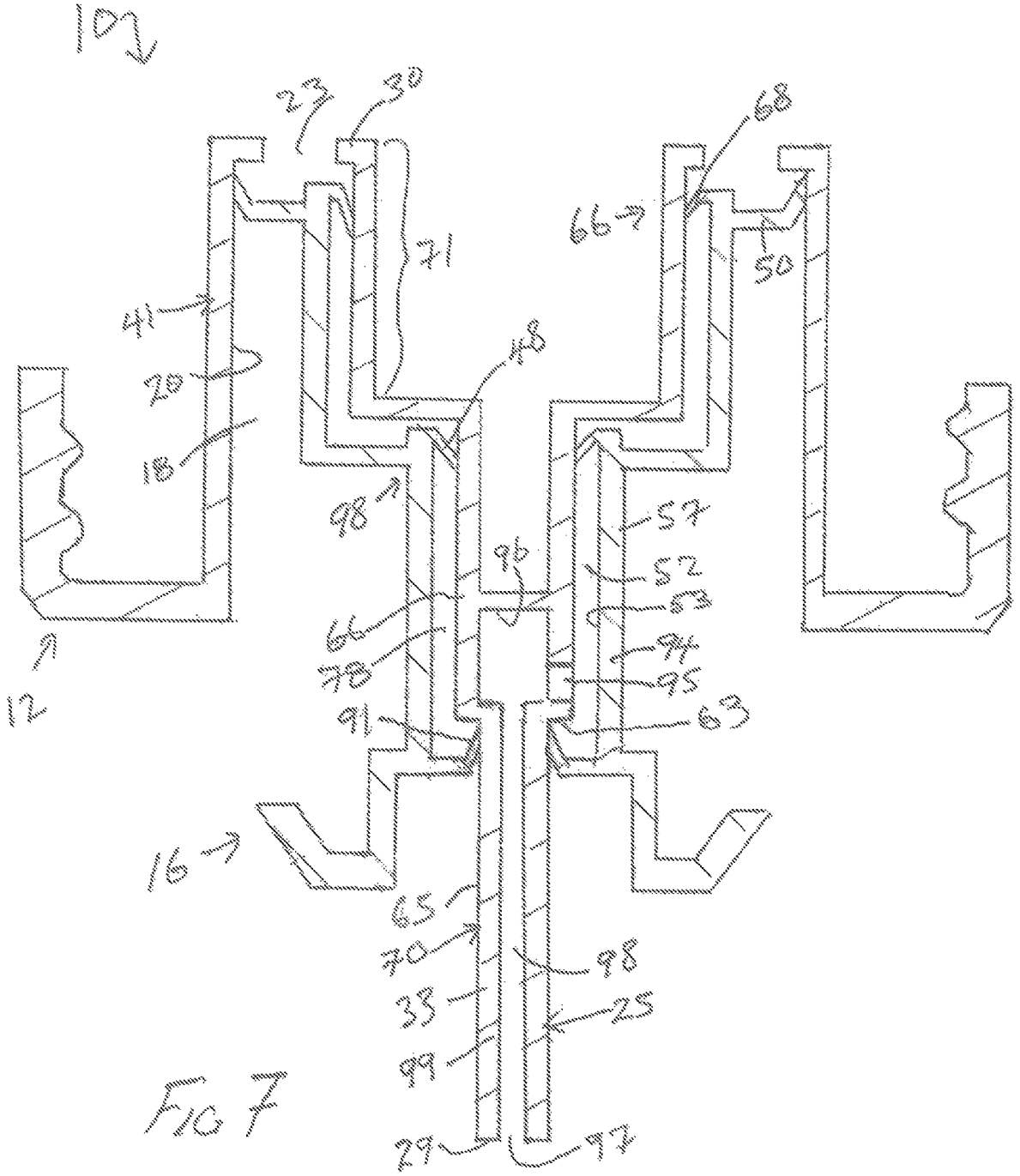
FIG. 7 is a cross-sectional side view of a fourth embodiment of a pump assembly in accordance with the present invention with the piston in a fully retracted position.

Reference is made to FIG. 7 which illustrates a pump assembly 10 in accordance with a fourth embodiment of the present invention. The pump assembly 10 of FIG. 7 is identical to the pump assembly of FIG. 4 but for the differences that the outer portion 70 of the center post 25 is provided to have a reduced diameter outer section 65 of a diameter and an enlarged diameter inner section 66 having a diameter greater than the diameter of the enlarged diameter inner section 66. The reduced diameter outer section 65 ends at a shoulder 63 at an axially inner end of the enlarged diameter inner section 66. The outlet flexing disc 48 slides on and engages the enlarged diameter inner section 66 of the outer portion 70 of the post member 25. The post sealing disc 91 slides on and engages the reduced diameter outer section 65 of the outer portion 70 of the post member 25. As with the embodiment in FIG. 6, the second compartment has a volume which increases in a withdrawal stroke and decreases in a retraction stroke with the result that advantageously in a withdrawal stroke fluid is drawn into the second compartment 78 via the transfer port 95 from the center passage 98 to draw fluid in the center passage axially inwardly from the discharge outlet 97.

Figure 8:
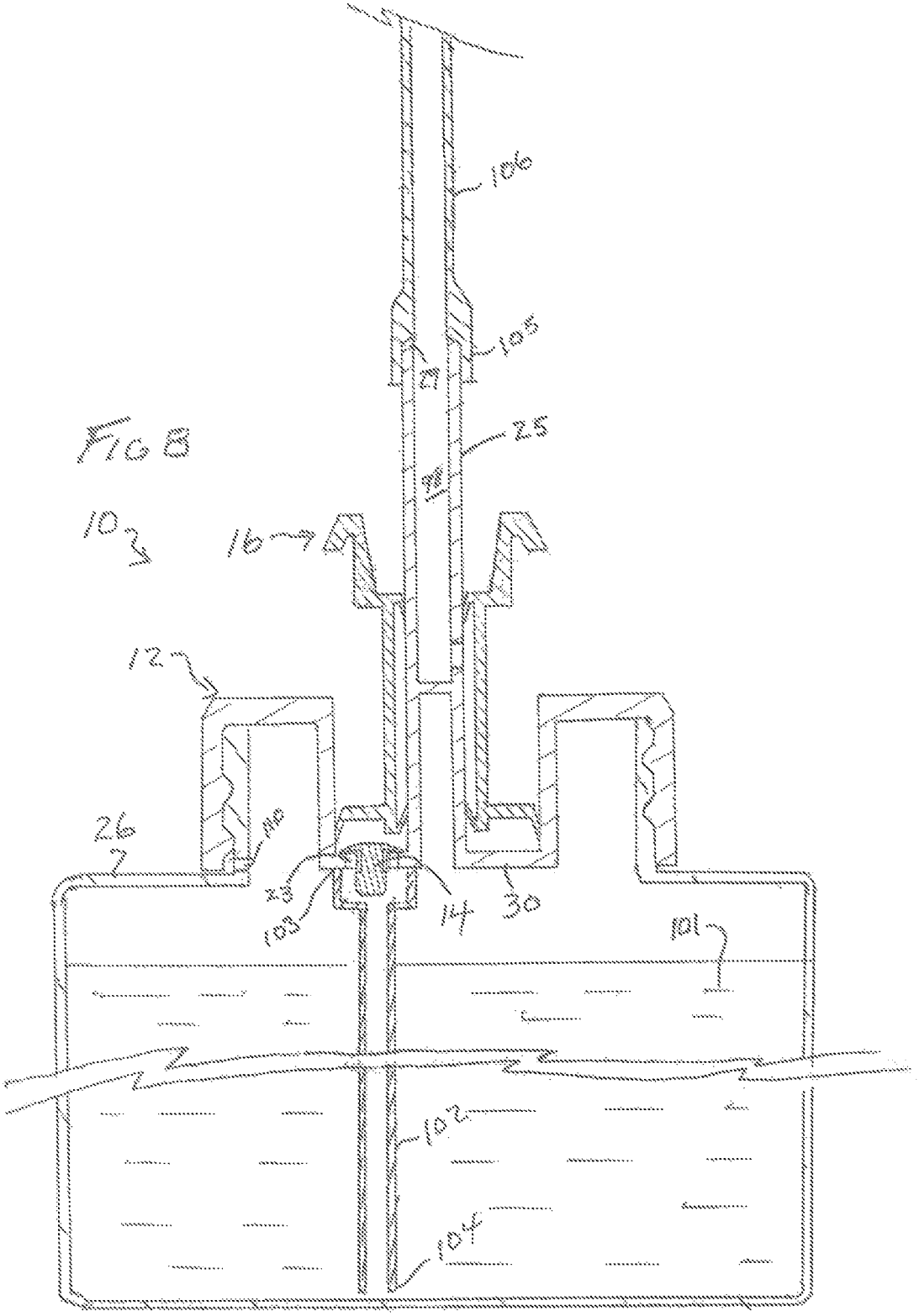
FIG. 8 is a cross-sectional side view showing the second embodiment of the pump assembly of FIG. 4 in an inverted condition compared to that shown in FIG. 4 as secured on a bottle and including a dip tube and a delivery tube.

Reference is made to FIG. 8 which illustrates a pump assembly 10 identical to that illustrated in the first embodiment of FIGS. 1 to 3, however, in an inverted orientation compared to the orientation illustrated in FIG. 2. In the configuration illustrated in FIG. 2, fluid from within the inverted bottle 26 will flow under gravity to the inlet openings 23. In FIG. 8, the bottle 26 is upright. In FIG. 8, the bottle is illustrated as being a rigid bottle with an air vent opening 110 to permit atmospheric air to enter the bottle when fluid 101 from the bottle has been dispensed to relieve any vacuum within the bottle 26. A dip tube 102 is sealably engaged to the end wall 30 at an upper end 103 of the dip tube 102 about the inlet openings 23. The dip tube 102 extends downwardly to an open lower end 104. The upper end 29 of the stationary post member 25 is sealably engaged to a socket coupling 105 of a delivery tube 106 for delivery of the discharge fluid from the center passage 98 to a desired location. The delivery tube 106 may be flexible.

FIG. 8 shows a non-collapsible bottle, however, in the event the bottle 26 in FIG. 2 is collapsible, then with the bottle completely filled with liquid, there is no need for the dip tube 102.

Although the disclosure describes and illustrates a preferred embodiment of the invention, it is to be understood that the invention is not limited to these particular embodiments. Many variations and modifications will now occur to those skilled in the art.

We claim:

1. A fluid pump comprising:

a piston chamber-forming member defining a chamber about a chamber axis, the chamber having a radially inwardly directed chamber wall, an inner inlet end and an outer open outlet end, the inlet end of the chamber providing for communication with a source of fluid, the piston chamber-forming member including a center post member extending along the axis coaxially of the chamber outwardly from an axially inner end of the post member to a distal axially outer end of the post member whereby an annular compartment is defined within the chamber between the chamber wall and the post member, the post member having an outer wall coaxial about the axis with a radially outwardly directed post side surface, a center passage provided coaxially within the outer wall of the post member, the center passage open at a discharge outlet, the center passage extending axially inwardly from the discharge outlet to a closed axially inner end, a transfer port radially through the outer wall of the post member providing communication between the center passage and the annular compartment through the outer wall, an annular piston-forming element having an axially extending tubular stem with a central passageway defined inside a radially inwardly directed inner tube surface, the central passageway open at an axial inner end and open at an axial outer end, the stem including an annular outlet flexing disc extending radially inwardly from the inner tube surface to a central bore axially through the outlet flexing disc, the stem including an annular post sealing disc extending radially inwardly from the inner tube surface to a central bore axially through the post sealing disc, the post sealing disc carried on the stem at a location spaced axially outwardly from the outlet flexing disc, the annular piston-forming element coaxially slidably received in the annular compartment for reciprocal movement between a retracted position and an extended position, with: (a) the chamber wall radially outwardly of the piston-forming element, and (b) the post member received coaxially within the central passageway passing through the central bore of the outlet flexing disc and the central bore of the post sealing disc, engagement between the piston-forming element and the chamber wall preventing fluid flow therebetween outwardly and inwardly, the outlet flexing disc about the central bore of the outlet flexing disc engaging the post side surface circumferentially thereabout axially inwardly of the transfer port preventing fluid flow axially inwardly between the outlet flexing disc and the post side surface but permitting fluid flow axially outwardly between the outlet flexing disc and the post side surface, the post sealing disc about the central bore of the post sealing disc engaging the post side surface circumferentially thereabout axially outwardly of the transfer port preventing fluid flow axially outwardly and inwardly between the post sealing disc and the post side surface, a first compartment defined between the piston chamber-forming member and the piston-forming element annularly about the post member, the first compartment having a volume that decreases with sliding of the piston-forming element inwardly relative the piston chamber-forming member and increases with sliding of the piston-forming element outwardly relative the piston chamber-forming member, an inlet one-way valve permitting fluid flow into the first compartment from the source of fluid but preventing fluid flow from the first compartment to the source of the fluid, a second compartment defined within the central passageway annularly about the post member radially between the radially outwardly directed post side surface and the radially inwardly directed inner tube surface and axially between the outlet flexing disc and the post sealing disc, wherein sliding of the piston-forming element inwardly relative the piston chamber-forming member reduces the volume of the first compartment with the inlet one-way valve preventing fluid flow from the first compartment to the source of fluid, the engagement between the piston-forming element and the chamber wall preventing fluid flow therebetween outwardly from the first compartment whereby fluid is forced to pass axially outwardly between the outlet flexing disc and the post member into the second compartment and from the second compartment via the transfer port into the center passage and via the central passage to out the discharge outlet, wherein sliding of the piston-forming element outwardly relative the piston chamber-forming member increases the volume of first compartment drawing fluid through the inlet one-way valve from the source of fluid into the first compartment, with the engagement between the piston-forming element and the chamber wall preventing fluid flow therebetween into the first compartment and the outlet flexing disc engaging the post member to prevent fluid flow axially therebetween axially inwardly into the first compartment from the second compartment.

2. A fluid pump as claimed in claim 1, wherein:

the first compartment defined annularly about the post member axially between the piston chamber-forming member and the piston-forming element inwardly of the engagement between the piston-forming element and the chamber wall and inwardly of the outlet flexing disc.

3. A fluid pump as claimed in claim 1, wherein:

the post member having an enlarged diameter axially inner section with a diameter and a reduced diameter axially outer section with a diameter less than the diameter of the axially inner section, the axially outer section located axially outwardly from the axially inner section, the post sealing disc slidably engaging the axially outer section of the post member, the outlet flexing disc slidably engaging the axially inner section of the post member, whereby sliding of the piston-forming element [inwardly] *outwardly* relative the piston chamber-forming member [reduces] *increases* a volume of the second compartment such that fluid within the center passage is drawn through the transfer port into the second compartment.

4. A fluid pump as claimed in claim 1, wherein: the stem including an annular chamber sealing disc extending radially outwardly from the stem with a circumferential radially outermost distal edge portion of the chamber sealing disc in engagement with the radially inwardly directed chamber wall providing the engagement between the piston-forming element and the chamber wall preventing fluid flow between the chamber sealing disc and the chamber wall axially outwardly and inwardly.

5. A fluid pump as claimed in claim 1, wherein the piston-forming element consists of an elastomeric material and the piston-forming element is a unitary element formed by injection molding.

6. A fluid pump as claimed in claim 1, wherein the center passage is open at the discharge outlet at the distal outer end of the post member.

7. A fluid pump as claimed in claim 1, wherein the inner inlet end includes an inner end wall, the axially inner end of the post member secured to the inner end wall with the center post member extending outwardly from the inner end wall along the axis.

8. A fluid pump as claimed in claim [1] *7*, including an inlet opening through the inner end wall in communication with the source of fluid, the inlet one-way valve across the inlet opening permitting fluid flow outwardly through the inlet opening from the source of fluid into the chamber [but preventing flow through the inlet opening from the source of fluid into the chamber] but preventing fluid flow inwardly through the inlet opening from the chamber to the source of fluid.

9. A fluid pump as claimed in claim 1, wherein the *inner* inlet end of the chamber having an inlet opening in communication with the source of fluid, the inlet one-way valve across the inlet opening permitting fluid flow outwardly through the inlet opening from the source of fluid into the chamber but preventing fluid flow inwardly through the inlet opening from the chamber to the source of fluid.

10. A fluid pump as claimed in claim 1, wherein:

the post member having an axially inner portion and an axially outer portion axially outwardly from the axially inner portion, the outer wall over the axially inner portion having a diameter, the outer wall over the axially outer portion having a diameter less than the diameter of the inner portion, the stem including an annular inlet flexing disc extending radially inwardly from the inner tube surface to a central bore axially through the inlet flexing disc, the inlet flexing disc carried on the stem at a location spaced axially inwardly from the outlet flexing disc, the inlet one-way valve provided by the inlet flexing disc about the central bore of the inlet flexing disc engaging the post side surface of the axially inner portion of the post member circumferentially thereabout preventing fluid flow axially inwardly between the inlet flexing disc and the post side surface but permitting fluid flow axially outwardly between the inlet flexing disc and the post side surface, the outlet flexing disc about the central bore of the outlet flexing disc engaging the post side surface of the axially outer portion of the post member circumferentially thereabout axially inwardly of the transfer port preventing fluid flow axially inwardly between the outlet flexing disc and the post side surface but permitting fluid flow axially outwardly between the outlet flexing disc and the post side surface, the first compartment is defined within the central passageway annularly about the post member radially between the radially outwardly directed post side surface and the radially inwardly directed inner tube surface and axially between the inlet flexing disc and the outlet flexing disc.

11. A fluid pump as claimed in claim 10, wherein:

the outer portion of the post member having an enlarged diameter axially inner section with a diameter and a reduced diameter axially outer section with a diameter less than the diameter of the axially inner section, the axially outer section located axially outwardly from the axially inner section, the post sealing disc slidably engaging the reduced diameter axially outer section of the post member, the outlet flexing disc slidably engaging the enlarged diameter axially inner section of the post member, whereby sliding of the piston-forming element [inwardly] *outwardly* relative the piston chamber-forming member [reduces] *increases* a volume of the second compartment such that fluid within the center passage is drawn through the transfer port into the second compartment.

12. A fluid pump as claimed in claim 10, wherein: the step including an [angular] *annular* chamber sealing disc extending radially outwardly from the stem with a circumferential radially outermost distal edge portion of the chamber sealing disc in engagement with the radially inwardly directed chamber wall providing the engagement between the piston-forming element and the chamber wall preventing fluid flow between the chamber sealing disc and the chamber wall axially outwardly and inwardly.

13. A fluid pump comprising:

a piston chamber-forming member defining a chamber about a chamber axis, the chamber having a radially inwardly directed chamber wall, an inner inlet end and an outer open outlet end, the inlet end of the chamber providing for communication with a source of fluid, the piston chamber-forming member including a center post member extending along the axis coaxially of the chamber outwardly from an axially inner end of the post member to a distal axially outer end of the post member whereby an annular compartment is defined within the chamber between the chamber wall and the post member, the post member having an outer wall coaxial about the axis with a radially outwardly directed post side surface, a center passage provided coaxially within the outer wall of the post member, the center passage open at a discharge outlet at the distal outer end of the post member, the center passage extending axially inwardly from the discharge outlet to a closed axially inner end, a transfer port radially through the outer wall of the post member providing communication between the center passage and the annular compartment through the outer wall, a one-way valve across the inlet end of the chamber permitting fluid flow outwardly but preventing fluid flow inwardly, an annular piston-forming element having an axially extending tubular stem with a central passageway defined inside a radially inwardly directed inner tube surface, the central passageway open at an axial inner end and open at an axial outer end, the stem including an annular outlet flexing disc extending radially inwardly from the inner tube surface to a central bore axially through the outlet flexing disc, the stem including an annular post sealing disc extending radially inwardly from the inner tube surface to a central bore axially through the post sealing disc, the post sealing disc carried on the stem at a location spaced axially outwardly from the outlet flexing disc, the annular piston-forming element coaxially slidably received in the annular compartment for reciprocal movement between a retracted position and an extended position, with:

(a) the chamber wall radially outwardly of the piston-forming element, and (b) the post member received coaxially within the central passageway passing through the central bore of the outlet flexing disc and the central bore of the post sealing disc, engagement between the piston-forming element and the chamber wall preventing fluid flow therebetween axially outwardly and inwardly, the outlet flexing disc about the central bore of the outlet flexing disc engaging the post side surface circumferentially thereabout axially inwardly of the transfer port preventing fluid flow axially inwardly between the outlet flexing disc and the post side surface but permitting fluid flow axially outwardly between the outlet flexing disc and the post side surface, the post sealing disc about the central bore of the post sealing disc engaging the post side surface circumferentially thereabout axially outwardly of the transfer port preventing fluid flow axially outwardly and inwardly between the post sealing disc and the post side surface, a first compartment defined between the piston chamber-forming member and the piston-forming element annularly about the post member inwardly of the engagement between the piston-forming element and the chamber wall and inwardly the outlet flexing disc, the first compartment having a volume that decreases with sliding of the piston-forming element inwardly relative the piston chamber-forming member and increases with sliding of the piston-forming element outwardly relative the piston chamber-forming member, a second compartment defined within the central passageway annularly about the post member radially between the radially outwardly directed post side surface and the radially inwardly directed inner tube surface and axially between the outlet flexing disc and the post sealing disc, wherein sliding of the piston-forming element inwardly relative the piston chamber-forming member reduces the volume of the first compartment with the inlet one-way valve preventing fluid flow from the first compartment to the source of fluid, the engagement between the piston-forming element and the chamber wall preventing fluid flow therebetween outwardly from the first compartment whereby fluid is forced to pass outwardly between the outlet flexing disc and the post member into the second compartment and from the second compartment via the transfer port into the center passage and via the central passage to out the discharge outlet, wherein sliding of the piston-forming element outwardly relative the piston chamber-forming member increases the volume of first compartment drawing fluid through the one-way valve from the source of fluid into the first compartment, with the engagement between the piston-forming element and the chamber wall preventing fluid flow therebetween into the first compartment and the outlet flexing disc engaging the post member to prevent fluid flow axially therebetween axially inwardly into the first compartment from the second compartment.

14. A fluid pump as claimed in claim 13, wherein: the stem including an annular chamber sealing disc extending radially outwardly from the stem with a circumferential radially outermost distal edge portion of the chamber sealing disc in engagement with the radially inwardly directed chamber wall providing the engagement between the piston-forming element and the chamber wall preventing fluid flow between the chamber sealing disc and the chamber wall axially outwardly and inwardly, the post member having an enlarged diameter axially inner section with a diameter and a reduced diameter axially outer section with a diameter less than the diameter of the axially inner section, the axially outer section located axially outwardly from the axially inner section, the post sealing disc slidably engaging the reduced diameter axially outer section of the post member, the outlet flexing disc slidably engaging the enlarged diameter axially inner section of the post member, whereby sliding of the piston-forming element [inwardly] *outwardly* relative the piston chamber-forming member [reduces] *increases* a volume of the second compartment such that fluid within the center passage is drawn through the transfer port into the second compartment.

15. A fluid pump as claimed in claim 12, wherein the first compartment is defined within the annular compartment between the piston chamber-forming member and the piston- forming element.

16. A fluid pump comprising:

a piston chamber-forming member defining a chamber about a chamber axis, the chamber having a radially inwardly directed chamber wall, an inner inlet end and an outer open outlet end, the inner inlet end including an inner end wall, the inlet end of the chamber having an inlet opening in communication with a source of fluid, the piston chamber-forming member including a center post member extending along the axis coaxially of the chamber outwardly from an axially inner end of the post member to a distal axially outer end of the post member whereby an annular compartment is defined within the chamber between the chamber wall and the post member, the post member having an outer wall coaxial about the axis with a radially outwardly directed post side surface, the post member having an axially inner portion and an axially outer portion axially outwardly from the inner portion, the axially inner portion located axially inwardly from the axially outer portion, the outer wall over the axially inner portion having a diameter, the outer wall over the axially outer portion having a diameter less than the diameter of the inner portion, a center passage provided coaxially within the outer wall of the post member, the center passage open at a discharge outlet, the center passage extending axially inwardly from the discharge outlet to a closed axially inner end, a transfer port radially through the outer wall of the post member in the outer portion of the post member providing communication between the center passage and the annular compartment through the outer wall, an annular piston-forming element having an axially extending tubular stem with a central passageway defined inside a radially inwardly directed inner tube surface, the central passageway open at an axial inner end and open at an axial outer end, the stem including an annular inlet flexing disc extending radially inwardly from the inner tube surface to a central bore axially through the inlet flexing disc, the stem including an annular outlet flexing disc extending radially inwardly from the inner tube surface to a central bore axially through the outlet flexing disc, the outlet flexing disc carried on the stem at a location spaced axially outwardly from the inlet flexing disc, the stem including an annular post sealing disc extending radially inwardly from the inner tube surface to a central bore axially through the post sealing disc, the post sealing disc carried on the stem at a location spaced axially outwardly from the outlet flexing disc, the annular piston-forming element coaxially slidably received in the annular compartment for reciprocal movement between a retracted position and an extended position, with:

(a) the chamber wall radially outwardly of the piston-forming element, (b) the post member received coaxially within the central passageway passing through the central bore of the inlet flexing disc, the central bore of the outlet flexing disc and the central bore of the post sealing disc, (c) engagement between the piston-forming element and the chamber wall preventing fluid flow axially therebetween outwardly and inwardly, (d) the inlet flexing disc about the central bore of the inlet flexing disc engaging the post side surface of the axially inner portion of the post member circumferentially thereabout preventing fluid flow axially inwardly between the inlet flexing disc and the post side surface but permitting fluid flow axially outwardly between the inlet flexing disc and the post side surface, (e) the outlet flexing disc about the central bore of the outlet flexing disc engaging the post side surface of the axially outer portion of the post member circumferentially thereabout axially inwardly of the transfer port preventing fluid flow axially inwardly between the outlet flexing disc and the post side surface but permitting fluid flow axially outwardly between the outlet flexing disc and the post side surface, (f) the post sealing disc about the central bore of the post sealing disc engaging the post side surface of the axially outer portion of the post member circumferentially thereabout axially outwardly of the transfer port preventing fluid flow axially outwardly and inwardly between the post sealing disc and the post side surface, wherein (g) a first compartment is defined within the central passageway annularly about the post member radially between the radially outwardly directed post side surface and the radially inwardly directed inner tube surface and axially between the inlet flexing disc and the outlet flexing disc, the first compartment having a volume that decreases with sliding of the piston-forming element inwardly relative the piston chamber-forming member and increases with sliding of the piston-forming element outwardly relative the piston chamber-forming member, (h) a second compartment is defined within the central passageway annularly about the post member radially between the radially outwardly directed post side surface and the radially inwardly directed inner tube surface and axially between the outlet flexing disc and the post sealing disc, (i) sliding of the piston-forming element inwardly relative the piston chamber-forming member reduces the volume of first compartment with the inlet flexing disc preventing fluid flow from the first compartment to the source of fluid, and fluid is forced to pass outwardly between the outlet flexing disc and the post member into the second compartment and from the second compartment via the transfer port into the central passage and via the central passage to out the discharge outlet, (j) sliding of the piston-forming element outwardly relative the piston chamber-forming member increases the volume of first compartment drawing fluid axially outwardly between the inlet flexing disc and the post member from the source of fluid into the first compartment, with the engagement between the piston-forming element and the chamber wall preventing fluid flow axially therebetween and the inlet flexing disc engaging the post member to prevent fluid flow therebetween axially inwardly.

17. A fluid pump as claimed in claim 16, wherein: the stem including an annular chamber sealing disc extending radially outwardly from the stem with a circumferential radially outermost distal edge portion of the chamber sealing disc in engagement with the radially inwardly directed chamber wall and providing the engagement between the piston-forming element and the chamber wall preventing fluid flow between chamber sealing disc and the chamber wall axially outwardly and inwardly.

18. A fluid pump as claimed in [any one of] claim 17 wherein:

the outer portion of the post member having an enlarged diameter axially inner section with a diameter and a reduced diameter axially outer section with a diameter less than the diameter of the axially inner section, the axially outer section located axially outwardly from the axially inner section, the post sealing disc slidably engaging the reduced diameter axially outer section of the post member, the outlet flexing disc slidably engaging the enlarged diameter axially inner section of the post member, whereby sliding of the piston-forming element [inwardly] *outwardly* relative the piston chamber-forming member [reduces] *increases* a volume of the second compartment such that fluid within the center passage is drawn through the transfer port into the second compartment.

[19. A fluid pump as claimed in claim 17 wherein the stem including an annular chamber sealing disc extending radially outwardly from the stem with a circumferential radially outermost distal edge portion of the chamber sealing disc in engagement with the radially inwardly directed chamber wall and providing the engagement between the piston-forming element and the chamber wall preventing fluid flow between chamber sealing disc and the chamber wall axially outwardly and inwardly.]

* * * * *